(12) United States Patent
Kawabuchi et al.

(10) Patent No.: US 7,873,918 B2
(45) Date of Patent: Jan. 18, 2011

(54) METHOD AND APPARATUS FOR DISPLAYING WORKFLOW

(75) Inventors: Yoichi Kawabuchi, Itami (JP); Daisuke Sakiyama, Kawanishi (JP); Okihisa Yoshida, Amagasaki (JP); Tomonari Yoshimura, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 186 days.

(21) Appl. No.: 11/480,421

(22) Filed: Jul. 5, 2006

(65) Prior Publication Data

US 2007/0008584 A1 Jan. 11, 2007

(30) Foreign Application Priority Data

Jul. 7, 2005 (JP) ............................. 2005-199155
Oct. 7, 2005 (JP) ............................. 2005-295297

(51) Int. Cl.
*G06F 3/048* (2006.01)
(52) U.S. Cl. ...................... 715/837; 715/772
(58) Field of Classification Search ................. 715/837, 715/859, 861
See application file for complete search history.

(56) References Cited

U.S. PATENT DOCUMENTS

| 5,669,040 | A | * | 9/1997 | Hisatake ...................... 399/83 |
| 6,405,718 | B1 | | 6/2002 | Yoshioka et al. |
| 7,050,186 | B1 | * | 5/2006 | Noda ......................... 358/1.15 |
| 7,167,767 | B2 | * | 1/2007 | Clayton et al. .............. 700/100 |
| 7,304,753 | B1 | * | 12/2007 | Richter et al. .............. 358/1.15 |
| 2003/0233387 | A1 | | 12/2003 | Watanabe et al. |
| 2004/0126122 | A1 | * | 7/2004 | Kanamoto et al. ........... 399/20 |
| 2004/0156066 | A1 | | 8/2004 | Mishima et al. |
| 2004/0243920 | A1 | * | 12/2004 | Kato .......................... 715/500 |
| 2005/0105135 | A1 | * | 5/2005 | Takahashi ................. 358/1.18 |
| 2006/0192997 | A1 | * | 8/2006 | Matsumoto et al. ........ 358/1.15 |

FOREIGN PATENT DOCUMENTS

| JP | 9-120357 A | 5/1997 |
| JP | 09-259181 | 10/1997 |
| JP | 11-096040 | 4/1999 |

(Continued)

OTHER PUBLICATIONS

A Notification of Reasons for Refusal issued in corresponding Japanese Patent Application No. 2005-295297, mailed Jun. 24, 2008, and translation thereof.

(Continued)

*Primary Examiner*—Weilun Lo
*Assistant Examiner*—Enrique W Iturralde
(74) *Attorney, Agent, or Firm*—Buchanan Ingersoll & Rooney PC

(57) ABSTRACT

A display method for displaying a workflow system composed of a plurality of discrete Boxes each associated with a document process and linked in a predetermined order. The workflow is defined for causing the processes to be sequentially executed. The workflow is displayed using icons representing the Boxes. If execution of the associated process has been completed, an icon representing a corresponding Box is overlaid with oblique lines. If execution of the associated process is currently in process, an icon representing a corresponding Box is overlaid with a graphical representation of a sand timer.

20 Claims, 26 Drawing Sheets

FOREIGN PATENT DOCUMENTS

| | | |
|---|---|---|
| JP | 11-149369 A | 6/1999 |
| JP | 2001-041115 | 2/2001 |
| JP | 2001-256186 | 9/2001 |
| JP | 2002-041115 | 2/2002 |
| JP | 2004-021744 | 1/2004 |
| JP | 2004-227476 | 8/2004 |
| JP | 2004-288052 | 10/2004 |
| JP | 2004-355066 A | 12/2004 |

OTHER PUBLICATIONS

Questioning dated Oct. 12, 2010 issued in the corresponding Japanese Patent Application No. 2005-199155, and English-language translation thereof.

\* cited by examiner

| BOX Name | Attribute | Public/Private | From | Event | Process | To | Box State |
|---|---|---|---|---|---|---|---|
| BOX A | Discrete | Private | None | Document Reception | Format Conversion | BOX B | Processed |
| BOX B | Compound | Private | BOX A | Document Reception | Save | BOX E | Processed |
| BOX C | Discrete | Private | None | Document Reception | Notification Mail Transmission | BOX E | Processed |
| BOX D | Discrete | Private | None | Document Reception | Notification Mail Transmission | BOX E | Processed |
| BOX E | Discrete | Public | BOX B | Document Reception | — | Printer | Processing |
| BOX F | Compound | Private | None | Document Reception | — | — | Processing |

| BOX Name | Relation | Components | | | |
|---|---|---|---|---|---|
| BOX B | OR | BOX C | BOX D | end | |
| BOX F | AND | BOX A | BOX B | BOX E | end |

| JOB Name | JOB State | JOB Definition BOX | User Name |
|---|---|---|---|
| JOB1 | Printing | BOX E | YYY |
| JOB2 | Print Queue | BOX E | XXX |
| JOB3 | Print Queue | None | ZZZ |
| JOB4 | Processed ⋯ (BOX A BOX B)<br>In-Process ⋯ BOX E | BOX F | www |

FIG.15

Box A    Delete

Box A is Component of Box F.
Deletion is Prohibited.

OK

METHOD AND APPARATUS FOR DISPLAYING WORKFLOW

This application is based on applications No. 2005-199155 and No. 2005-295297 filed in Japan, the contents of which are hereby incorporated by reference.

BACKGROUND OF THE INVENTION (1) Field of the Invention

The present invention relates generally to a method for displaying a workflow.

(2) Description of the Related Art

MFPs (Multi-Function Peripherals) are document processors that include, for example, printer, FAX, and copier capabilities. Some of such conventional document processors are known to have a Box function which is associated in advance with a process to be executed on a document saved by the respective document processor.

For example, JP patent application publication No. 2004-227476 discloses a document processor having Box functions associated with document processing, such as modification and printing of a document. With a document processor having a Box function, users are allowed to process a document on the document processor, saving a trouble of transferring the document to a PC (personal computer).

Users of such a document processor desire to automate routine tasks carried out on a daily basis using the document processor.

There are various patterns of routine tasks, depending on who and which department uses the document processor. In addition, since each routine task is a combination of individual processes, the number of task patterns further increases with increase in the number of processes that the document processor is capable of.

With this being the situation, when Boxes are provided for all the routine task patterns expected to take place, many resources (both hardware and software resources) are required, which is undesirable.

SUMMARY OF THE INVENTION

The inventors of the present invention are developing a workflow system composed of a document processor for linking discrete Boxes each associated with a different process to cause the processes to be sequentially executed on a document. Consequently, the workflow system is enabled to handle a variety of routine tasks while saving resources.

However, when a trouble (error) occurs somewhere in a process sequence being executed in the workflow system, it is difficult for the user to locate a discrete Box in which the trouble occurred. Accordingly, the user is not able to promptly take corrective actions.

In addition, especially when executing time-consuming processes, the user may desire to know the execution progress of the processes.

To address the above problem and demand, the present invention aims to provide a method and apparatus for displaying, to the user, the execution progress of discrete Boxes included in the workflow.

In order to achieve the above aim, the present invention provides a workflow display method for displaying a workflow composed of a plurality of discrete Boxes each associated with a document process and linked in a predetermined sequence. The workflow is defined for causing the processes to be sequentially executed. The workflow display method includes: a sequence display step of displaying icons representing the linked discrete Boxes laid out in the predetermined sequence; and a state display step of displaying information showing an execution state of each discrete Box, out of all the discrete Boxes corresponding to the icons displayed, associated with a currently executed process.

In another aspect, the present invention provides a workflow display apparatus for displaying a workflow composed of a plurality of discrete Boxes each associated with a document process and linked in a predetermined sequence. The workflow is defined for causing the processes to be sequentially executed. The workflow display apparatus includes: a sequence display unit operable to display icons representing the linked discrete Boxes laid out in the predetermined sequence; and a state display unit operable to display information showing an execution state of each discrete Box, out of all the discrete Boxes corresponding to the icons displayed, associated with a currently executed process.

With the structures stated above, the execution state of each discrete Box associated with a process currently in progress is displayed. Thus, the user is allowed to confirm the execution state of the processes.

Here, regarding the workflow display method of the present invention, in the state display step, the icons representing the linked discrete Boxes may be displayed differently depending on whether the process associated with a respective Box has not been initiated or has been completed. Regarding the workflow display apparatus of the present invention, the display unit may be further operable to display the icons representing the linked discrete Boxes differently depending on whether the process associated with a respective Box has not been initiated or has been completed.

Here, regarding the workflow display method and apparatus according to the present invention, the execution state information may show how much of the entire process has already been completed.

With the structure stated above, the user convenience improves, especially when the user requests a time-consuming process or when a user-requested process is placed in standby due to a time-consuming process.

Here, regarding the workflow display method and apparatus according to the present invention, the execution state information may be obtained using a history of processes previously executed.

Here, regarding the workflow display method and apparatus according to the present invention, the execution state information may show a remaining time taken to complete the process.

Here, regarding the workflow display method and apparatus according to the present invention, the execution state information may show that the process is halted due to an error.

With the structure stated above, the user is given a clue to locate a discrete Box which caused the trouble.

Here, the workflow display method may further include a skip selecting step of displaying a prompt for selecting whether to skip the halted process. Here, the workflow display apparatus may further include a skip selecting unit operable to display a prompt for selecting whether to skip the halted process.

With the structure stated above, it is possible to avoid the processing delay owing to an error.

Here, the workflow display method may further include: a receiving step of receiving selection of an icon from among all the icons displayed; and a detail display step of simultaneously displaying, for a discrete Box corresponding to the icon selected in the receiving step, an execution state of the associated process executed on a standalone basis and an execution state of the associated process executed in a sequence of processes associated with a compound Box. Here, the workflow display apparatus may further include: a receiving unit operable to receive selection of an icon from among all the icons displayed; and a detail display unit operable to simultaneously display, for a discrete Box corresponding to the icon selected by the receiving unit, an execution state of the associated process executed on a standalone basis and an execution state of the associated process executed in a sequence of processes associated with a compound Box.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a table showing a Box-definition list 35 shown in FIG. 2;

FIG. 4 is a table showing a Box-link list 36 shown in FIG. 2;

FIG. 5 is a table showing a Job list 38;

FIG. 15 shows a warning screen to inform that a selected Box is not allowed to be deleted;

DESCRIPTION OF THE PREFERRED EMBODIMENT

Embodiment

Hereinafter, a description is given first to the structure of a workflow system. Then, a description is given to a workflow display method according to an embodiment of the present invention.

Figure 1:
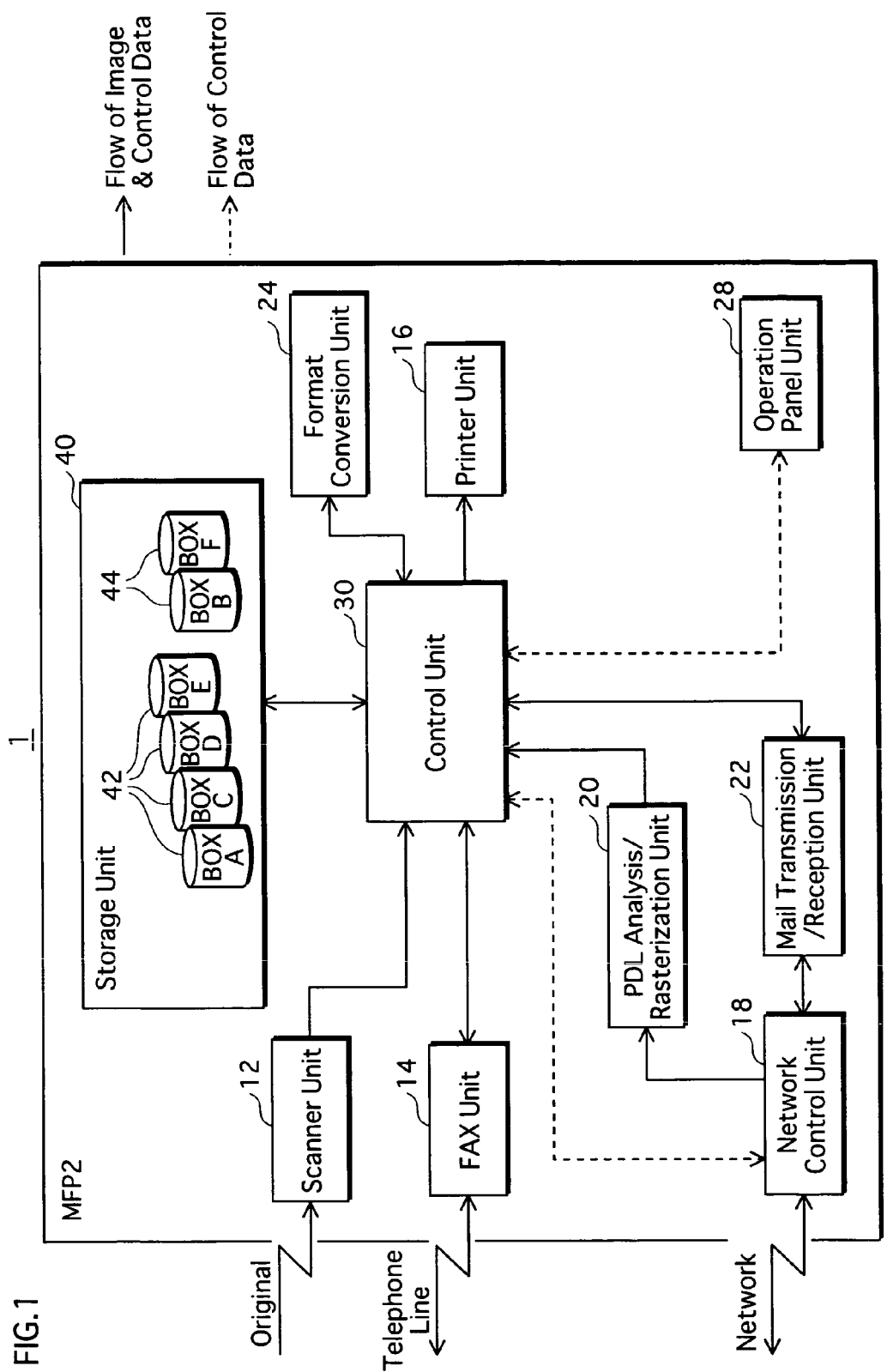
FIG. 1 is a block diagram showing the overall configuration of a workflow system according to an embodiment of the present invention.

FIG. 1 is a block diagram showing the overall configuration of a workflow system 1.

The workflow system 1 assists users with routine tasks by automatically controlling processes in the sequence set in advance. The workflow system 1 is composed of an MFP 2, which is a document processor.

The MFP 2 includes a scanner unit 12, a FAX unit 14, a printer unit 16, a network control unit 18, a PDL analysis/rasterization unit 20, a mail transmission/reception unit 22, a format conversion unit 24, an operation panel unit 28, a control unit 30, and a storage unit 40. Hereinafter, a description is given to each unit.

The scanner unit 12 reads an original document placed on, for example, a sheet feeder to generate image data, and passes the image data to the control unit 30.

The FAX unit 14 transmits and receives a FAX via a telephone line and passes an image of a received FAX to the control unit 30.

The printer unit 16 produces printed output of received data.

The network control unit 18 includes, for example, NIC (Network Interface Card), and transmits and receives data via a network such as LAN.

The PDL analysis/rasterization unit 20 analyzes the type of PDL (Page Description Language) data received from the network control unit 18 and rasterizes the PDL data into image data.

The mail transmission/reception unit 22 includes a mailer and composes, transmits, and receives e-mail.

The format conversion unit 24 converts document data from one format to another (such as, TIFF, PDF, JPEG, RAW, and BMP).

The control unit 30 is implemented by hardware including CPU, RAM, and rewritable flash-ROM, and controls overall operation of each unit of the MFP 2.

The operation panel unit 28 includes a liquid crystal panel, a touch panel disposed on the front surface of the liquid crystal panel, and push buttons. The operation panel unit 28 is capable of various displays. In addition, the operation panel unit 28 receives user input and passes the received user input to the control unit 30.

For the structural reason, the liquid crystal panel is smaller in screen size (normally, on the order, at most, of a few inches), as compared with PC monitors, and the resolution is not particularly high. In addition, the touch panel and the push button are rather inconvenient for quick keying. In view of this, it is desirable to simplify the display and operator interface as much as possible.

The storage unit 40 is implemented by, for example, a storage device, such as an HDD (Hard Disk Drive), a rewritable DVD device, and a flash memory. The storage unit 40 has discrete Boxes 42 and compound Boxes 44. Each Box is a space on the storage unit 40 and has document management capability. The term "document" used herein refers to data manipulated by the MFP 2. Specific examples of documents include: documents (document files) generated using any of various types of software, such as word processor, spreadsheet, database, and presentation software; image data generated by the scanner unit 12; and data received as e-mail attachment by the mail transmission/reception unit 22.

Figure 2:
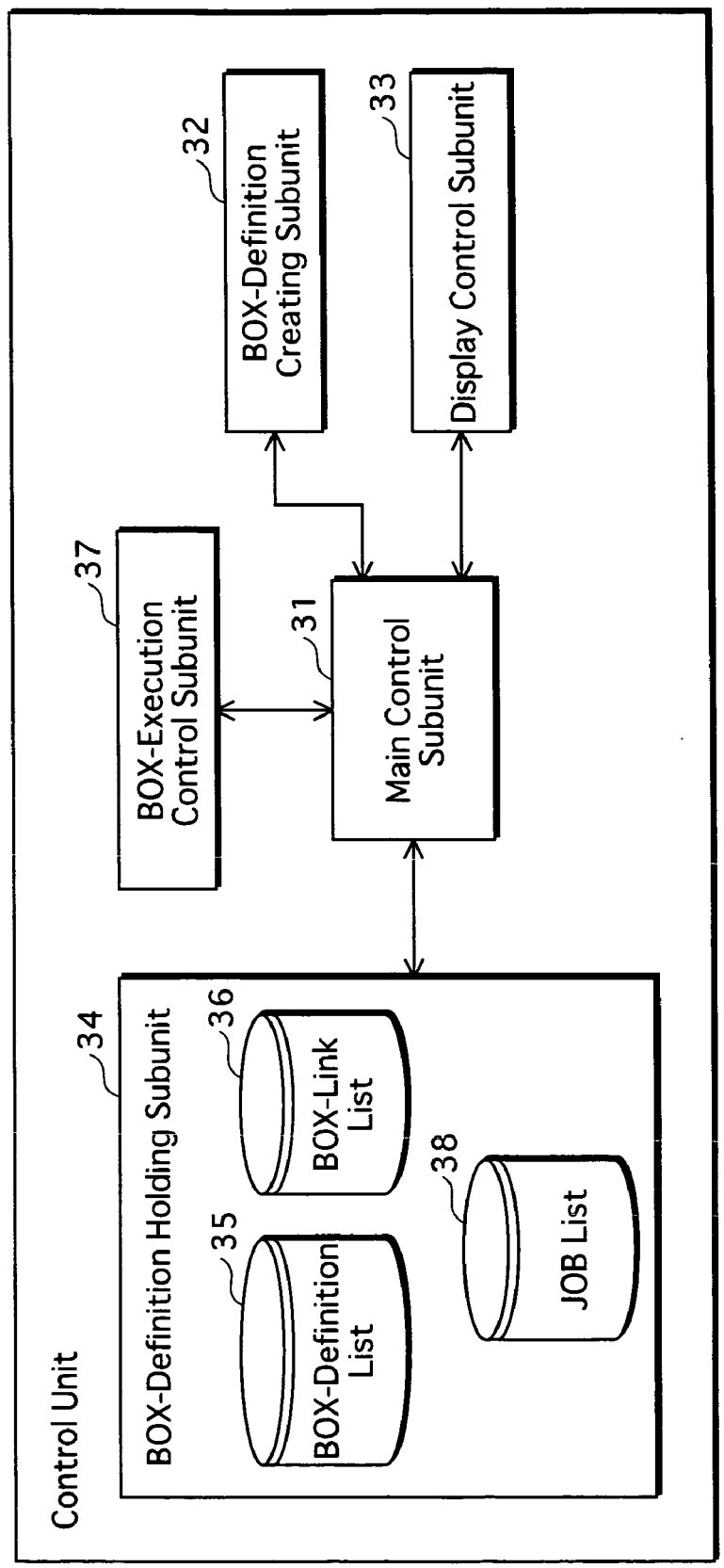
FIG. 2 is a functional block diagram showing the structure of a control unit 130 shown in FIG. 1.

FIG. 2 is a functional block diagram showing the structure of the control unit 30.

The control unit 30 includes a main control subunit 31 controlling operation of each subunit, a Box-definition creating subunit 32, a display control subunit 33, a Box-definition holding subunit 34, and a Box-execution control subunit 37.

The Box-definition creating subunit 32 creates and updates a Box-definition list 35 and a Box-link list 36, in accordance with user input received by the operation panel unit 28.

The display control subunit 33 controls the screen display presented on the operation panel unit 28.

The Box-definition holding subunit 34 holds the created Box-definition list 35, Box-link list 36, and Job list 38.

The Box execution control subunit 37 causes the processes associated with relevant Boxes to be executed, in accordance with the lists held in the Box-definition holding subunit 34.

Next, a description is given sequentially to the Box-definition list 35, the Box-link list 36, and the Job list 38.

FIG. 3 is a table showing the Box-definition list 35.

First, the fields of the table are explained.

An "Attribute" field shows the attribute of a respective Box. If a Box is set (defined) to be composed of Boxes linked to one another, the Box has the attribute of "Compound". Otherwise, the Box has the attribute of "Discrete". A discrete Box may be executed alone or as a component of a compound Box (i.e. as a child Box belonging to a parent compound Box). A detailed description will be given later.

The "Public/Private" field shows either "Public" or "Private". If a Box is shared among multiple users (placed in the public domain), "Public" is shown. Otherwise, "Private" is shown for the Box.

The "From" field shows an input source specified for a respective Box. The "To" field shows an output destination specified for a respective Box. The specification of the input source and output destination are valid only when a respective Box is executed on a standalone basis. When a respective Box is executed as part of a compound Box, the specification of the input source and output destination is discarded, and the Box is executed in the sequence shown in the Box-link list 36 (see FIG. 4).

The "Event" field shows a condition to be met to initiate execution of a respective Box.

The "Process" field shows a process associated for a respective Box. In the case where a Box operates on a standalone basis, the associated process is invoked at the time when the condition shown in the "Event" field is met.

Note that "BoxB" is associated with a process of saving. The process of saving is to store a document into a predetermined area. For example, through the process of saving, a document is saved to a file server which is external to the MFP 2, by transferring the document via SMB (Server Message Block).

The "Box State" field shows the progress of execution of a respective Box (Standby, Processing, or Processed).

FIG. 4 is a table showing the Box-link list 36.

The Box-link list 36 shows, for each compound Box, discrete Boxes linked to one another, along with the link relation between the discrete Boxes. The discrete Boxes are listed in the sequence of execution.

More specifically, the "Component" field shows discrete Boxes being components constituting the nodes of a workflow defined by a respective compound Box.

When the "Link Relation" field shows "AND", the processes associated with the discrete Boxes belonging to the compound Box are serially performed one by one in the order of listing. The process associated with the compound Box itself is performed following the process associated with the last discrete Box. Note that when no process is associated with the compound Box itself, the execution of the compound Box completes upon execution of the last discrete Box.

Specifically, in the case of "Box F", the processes associated with "Box A", "Box B", and "Box E" are sequentially executed in the stated order. The execution of "Box F" completes upon completion of a print job associated with "Box E", which is the last discrete Box.

When the "Relation" field shows "OR", on the other hand, the processes associated with the discrete Boxes belonging to the compound Box are performed in parallel. The process associated with the compound Box itself is executed after execution of all the component Boxes.

Specifically, in the case of "Box B", the processes associated with "Box C" and "Box D" (Notification Mail Transmission) are performed in parallel. Then, the process associated with "Box B" (Saving) is performed.

FIG. 5 is a table showing a Job list 38.

The Job list 38 shows the state of each Job and held, for example, in the Box-definition holding subunit 34.

A "Job State" field shows the execution state of a respective Job. For a Job defined by a compound Box, the "Job State" field shows the execution state of all Jobs associated with all the discrete Boxes included in the Compound Box. The execution state of the compound Box shows either "Processed", "Processing", or "Standby" for each discrete Box. It is applicable to display the execution state using the wording specific to a respective Job (such as, "Transmitted" "Transmitting" and "transmission queue").

It is also applicable to sequentially update each Job state (explaining the Jobs of the Box processing), during a later-described step S111 of Box processing. To this end, relevant information is sequentially passed to the MPF 2, and the main control subunit 31 obtains the relevant information.

Referring back to the Job list 38, a "Job Name" field shows the name identifying a respective job.

The "Job Definition Box" field shows the name of a Box by which a respective job is defined. In the case of a job not defined by a Box, "None" is shown in the field.

The "User Name" field shows the name of a user who issued a respective job.

Now, a description is given to processing performed by the control unit 30 of the MFP 2.

Figure 6:
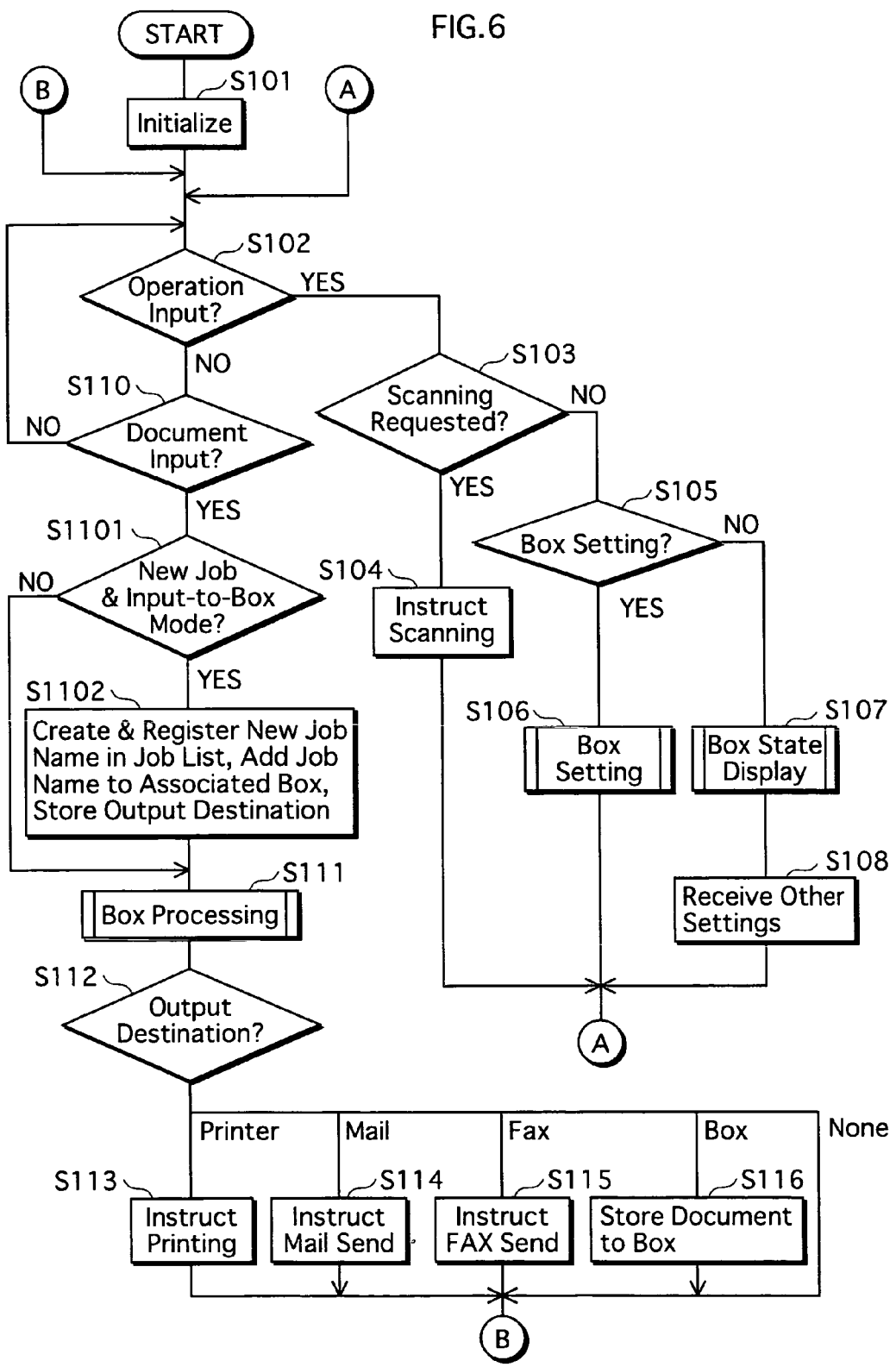
FIG. 6 is a flowchart of processing performed by the control unit 30.

FIG. 6 is a flowchart of processing performed by the control unit 30.

First of all, flags, variables, and the like are initialized (S101).

When user input is received (S102: Yes) and the received input requests scanning (S103: Yes), the control unit 30 issues a scan start instruction to the scanner unit 12 (S104) to cause scanning to be started. When the received input requests Box condition setting (S105: Yes), a subroutine for Box Setting (S106) is called. Otherwise (S105: No), a subroutine of Box State Display (S107) is called. After the subroutine of Box State Display, processing for receiving other settings is performed (S108).

When a document is input (S110: Yes), a step S1101 is performed to judge whether a new job is requested to be processed on the input document and the requested job is in an "Input-to-Box mode". The Input-to-Box mode refers to a mode in which an input document is requested to be passed to a specified Box. In one example of the Input-to-Box mode, a scanned document is requested to be passed to a specified Box (Scan-to-Box).

In a step S1102, a new Job name is created and registered in the Job list 38 (see FIG. 5). In addition, information showing the name of a Job definition Box that corresponds in the Job list 38 to the new Job name (the Box specified in the Input-to-Box mode is determined as the Job definition Box) is stored into an output destination buffer, along with the new job name.

Box Processing

Figure 7:
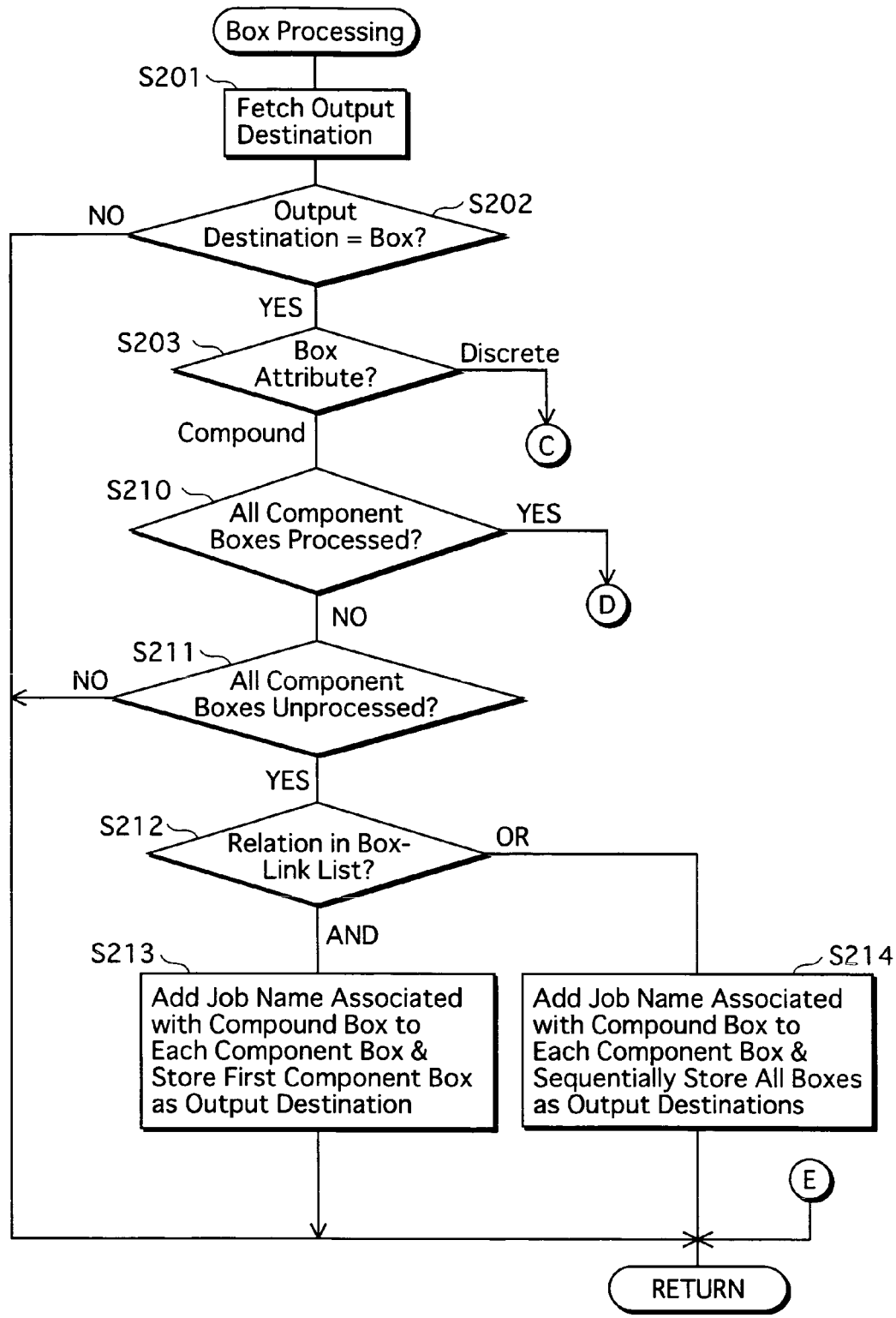
FIG. 7 is part of a flowchart of Box processing.
Figure 8:
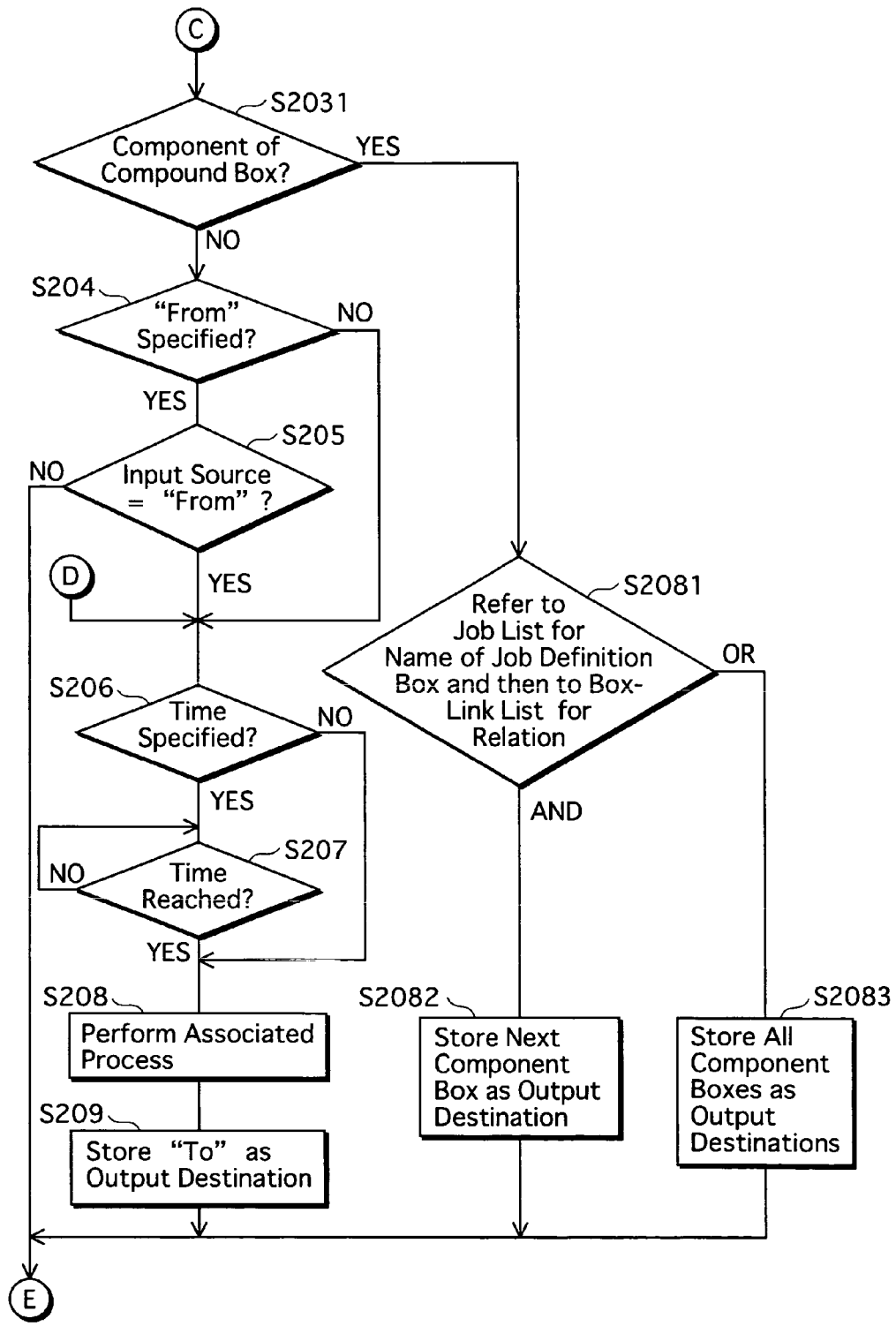
FIG. 8 is part of the flowchart of Box processing shown in FIG. 7.

FIGS. 7 and 8 show a flowchart of Box processing.

First in the Box processing, an output destination is fetched from the output destination buffer (S201), along with the Job name information attached thereto. The output destination buffer is a FIFO (First-In First-Out buffer) for storing, in list form, output destinations of documents.

When the fetched output destination is a Box whose attribute is "discrete" (S202: Yes, S203: Discrete), a step S2031 is performed. In the step S2031, it is judged whether a process associated with the discrete Box is part of a process sequence associated with a compound Box. This judgment is made in the following manner. First, a reference is made to the Job list 38 to retrieve the name of the Job definition Box corresponding to the Job name fetched with the output destination (i.e. the discrete Box). Then, a reference is made to the Box-link list 36 to see whether the thus retrieved Box name is found in the list.

If the process associated with the discrete Box is not part of a process sequence associated with a compound Box (S2031: No), an input source judgment is performed in steps S204 and S205.

The input source judgment is made to avoid performing a process not indented by a user. In addition, the input source judgment is to reduce a security threat that a document is input from an unexpected source. If the input source judgment result shows that required judgment criteria are met (S204: No; or S204: Yes, S205: Yes), steps S206 and S207 are preformed, so that execution of the discrete Box is placed into standby until a specified is reached.

When no time is specified (S206: No) or the specified time has come (S207: Yes), the process shown in the Box-definition list 35 to be associated with the discrete Box is executed (S208).

Upon initiating the execution of the associated process, if the initiated process is associated with a discrete Box (i.e. defined by the discrete Box), the Job list 38 and the Box-definition list 35 are both updated to change the Job state of a corresponding Job from "Standby" to "Processing".

If the initiated process is associated with a discrete Box that is the first component of a compound Box, the Job list 38 and the Box-definition list 35 are both updated to change the Job state of a corresponding Job from "Standby" to "Processing".

On the other hand, if the initiated process is associated with a discrete Box that is the second component of a compound Box or onward, the Job list 38 is updated to change the Job state of a corresponding Job from "Standby" to "Processing", while the Box-definition list 35 remains unupdated.

Next, the output destination shown in the "To" field of the Box-definition list 35 is stored into the output destination buffer (S209). The processing then returns to the main routine.

In the case where the process associated with the discrete Box is executed in a process sequence associated with a compound Box (S2031: Yes), a step S2081 is performed. In the step S2081, a reference is made to the Job list 38 to retrieve the name of the Job definition Box corresponding to the Job name fetched with the output destination (i.e. the discrete Box). Then, a reference is made to the Box-link list 36 to identify the relation shown for a compound Box that includes the thus retrieved Box name.

If the relation is "AND" (S2081: "AND"), from among all the components (i.e. discrete Boxes) of the compound Box, the discrete Box following the currently processed discrete Box in the Box-link list 36 is stored into the output destination buffer (S2082).

If the relation is "OR" (S2081: "OR"), the compound Box that includes the currently processed discrete Box is stored into the output destination buffer (S2083).

In the step S203, when the attribute is "Compound" (S203: "Compound"), a reference is made to the Box-definition list 35 and the Box-link list 36 to judge whether all the components (i.e. discrete Boxes) included in the currently processed compound Box have been executed (S210). If not all the discrete Boxes have been executed yet (S210: No), it is further judged whether all the discrete Boxes are still unprocessed (i.e. none of the component Boxes has been executed yet) (S211). If all the component Boxes are still unprocessed (S211: Yes), a step S212 is performed.

If the "relation" shown in the Box-link list 36 is "AND" (S212: AND), information showing the name of the Job corresponding to the currently processed compound Box is added to every component (i.e. discrete Box) of the compound Box. In addition, the first component (i.e. discrete Box) shown in the Box-link list 36 is stored, along with the Job name information, into the output destination buffer as the output destination (S213). For example, in the case where "Box F" is currently processed Box, information showing the name of the corresponding Job ("Job 4") is added to each of "Box A", "Box B", and "Box E". In addition, the first component, which is the discrete "Box A", is stored, along with the Job name information, into the output destination buffer as the output destination.

If the "relation" shown in the Box-link list 36 is "OR" (S212; OR), information showing the name of the Job corresponding to the currently processed compound Box is added to every component (i.e. discrete Box) of the compound Box. In addition, all the components (i.e. discrete Boxes) are sequentially stored, along with the Job name information, into the output destination buffer in the order shown in the Box-link list 36 (S214). For example, in the case where "Box B" is the currently processed compound Box, information showing the name of the corresponding Job is attached to each of "Box C" and "Box D". In addition, "Box C" and "Box D" are sequentially stored, along with the Job name information, into the output destination buffer in the stated order.

Referring back to the flowchart shown in FIG. 6, when the output destination fetched from the output destination buffer is a printer (S112, Printer), the document received in the step S110 is passed to the printer unit 16 and printing is instructed (S113). When the output destination is mail (S112: Mail), the mail transmission/reception unit 22 is instructed to send e-mail to an e-mail address set in advance. When the output destination is FAX (S112: FAX), the FAX unit 14 is instructed to send a FAX to a telephone number set in advance (S115).

When the output destination is a Box (S112: Box), the received document is stored into the designated Box (S116). At this time, the Box regards the document as a newly input document. That is, an event of document input is regarded to occur (S110: Yes) and thus the Box processing (S111) will be performed for the designated Box.

Upon completion of the execution of the associated process, if the completed process is associated with a discrete Box, the Job list 38 and the Box-definition list 35 are both updated to change the Job state of a corresponding Job from "Processing" to "Processed".

If the completed process is associated with a discrete Box that is not the last component of a compound Box, the Job list 38 is updated to change the Job state of a corresponding Job from "Processing" to "Processed", while the Box-definition list 35 remains unupdated.

On the other hand, if the completed process is associated with a discrete Box that is the last component of a compound Box, the Job list 38 and the Box-definition list 35 are both updated to change the Job state of a corresponding Job from "Processing" to "Processed".

Box Setting

Figure 9:
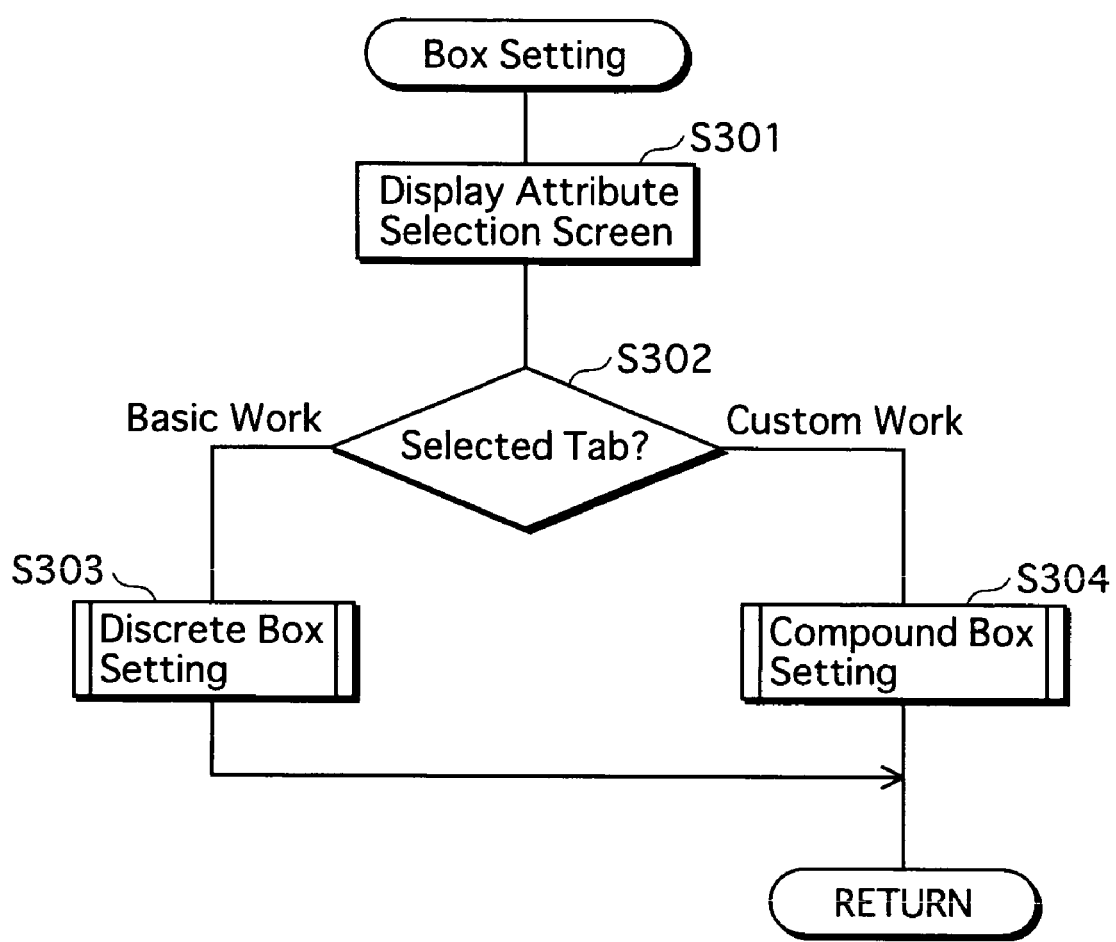
FIG. 9 is a flowchart showing Box setting processing.

FIG. 9 is a flowchart showing Box setting processing.

In the Box setting processing, first, the operation panel unit 28 displays an attribute selection screen for receiving user input selecting the attribute of a Box to be newly set (S301).

Figure 10:
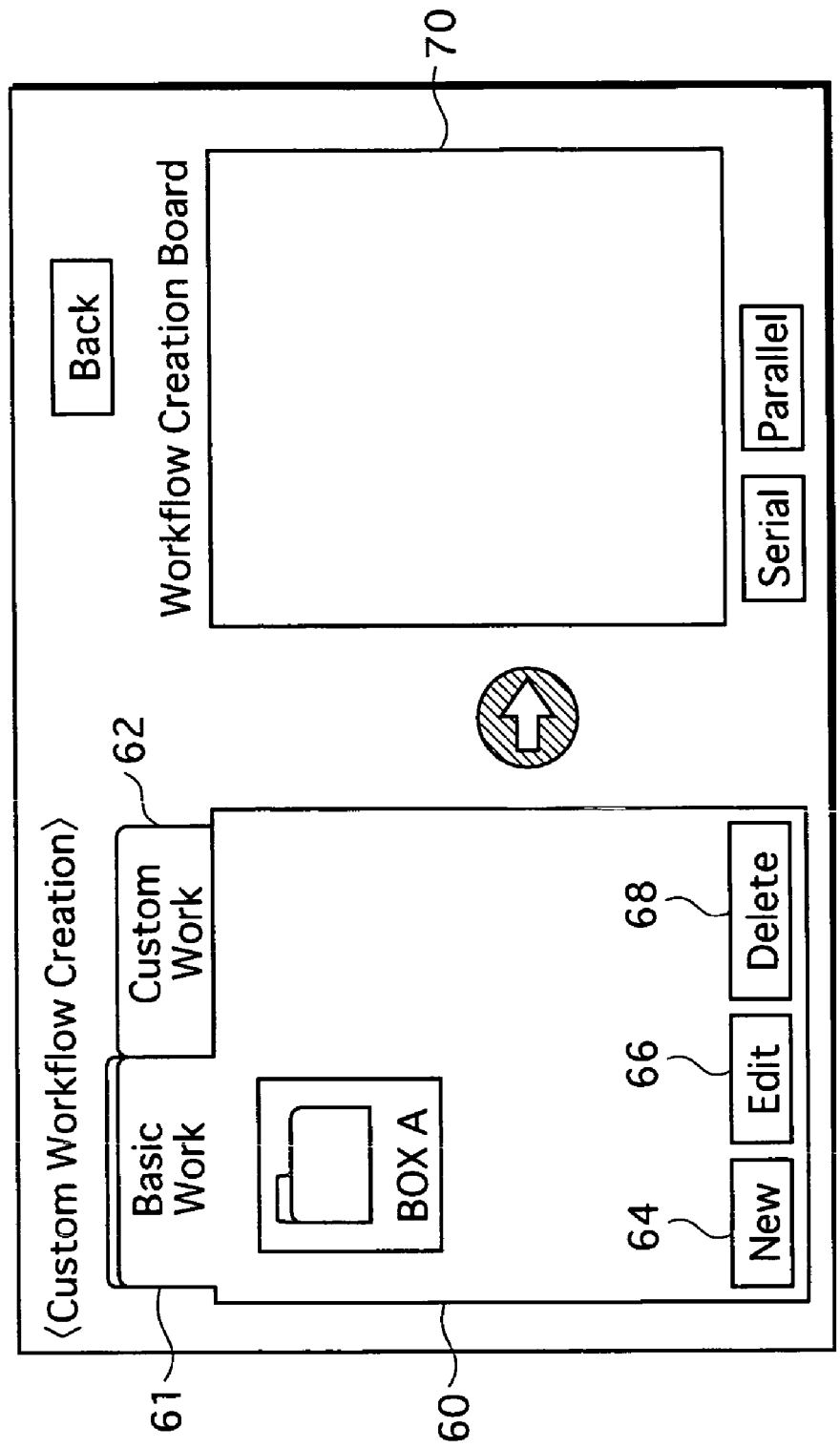
FIG. 10 shows an attribute selection screen.

FIG. 10 shows the screen displayed in the step S301.

On the screen, a window 60 is displayed on the left and a rectangular workflow creation board 70 is displayed on the right.

The window 60 has two tab keys at the top thereof. One is a "Basic Work" tab key 61 and the other is a "Custom Work" tab key 62. With a touch of the tab keys, a corresponding tab is activated and presented on the screen. Hereinafter, the window 60 is referred to as a basic work area 60 when the "Basic Work" tab is activated, and as a custom work area 60 when the "Custom Work" tab is activated.

With a touch of the "Basic Work" tab key 61 (S302: Basic Work), discrete Box setting is performed (S303). With a touch of the "Custom Work" tab key 62, on the other hand (S302: Custom Work), Compound Box setting is performed (S304).

Discrete Box Setting

Figure 11:
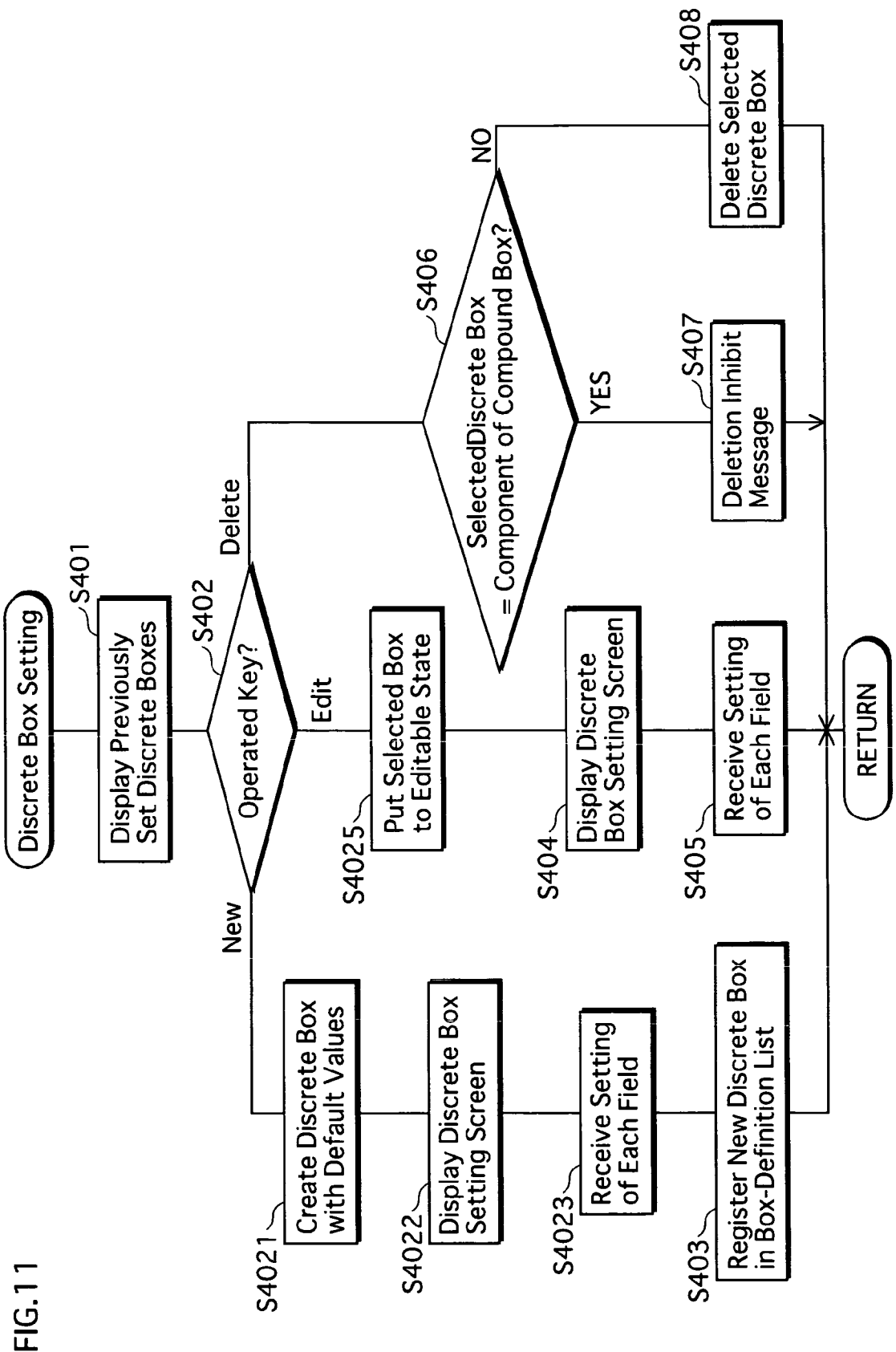
FIG. 11 is a flowchart of discrete Box setting.

FIG. 11 is a flowchart of the discrete Box setting.

First, the Box-definition list 35 is read, so that all the previously set discrete Boxes are displayed in the basic work area 60 as shown in FIG. 10 (S401).

With a touch of a "New" key 64 (S402: New), default values are read to create a new discrete Box with the default values (S4021), a discrete Box setting screen is displayed (S4022), and setting for each field of the Box-definition list 35 is received from the user (S4023). Then, the thus created new discrete Box is additionally registered in the Box-definition list 35 (S403).

With a touch of an "Edit" key 66 under the state where a previously set Box is selected (ON-State) by touching the Box on the screen (S402: Edit), the selected Box is put to an editable state (S4025), and the display is switched to the discrete Box setting screen for the selected Box (S404).

With a touch of a "Delete" key 68 when a previously set Box is in ON-State (S402: Delete), a step S406 is performed. The step S406 will be described later.

Figure 12:
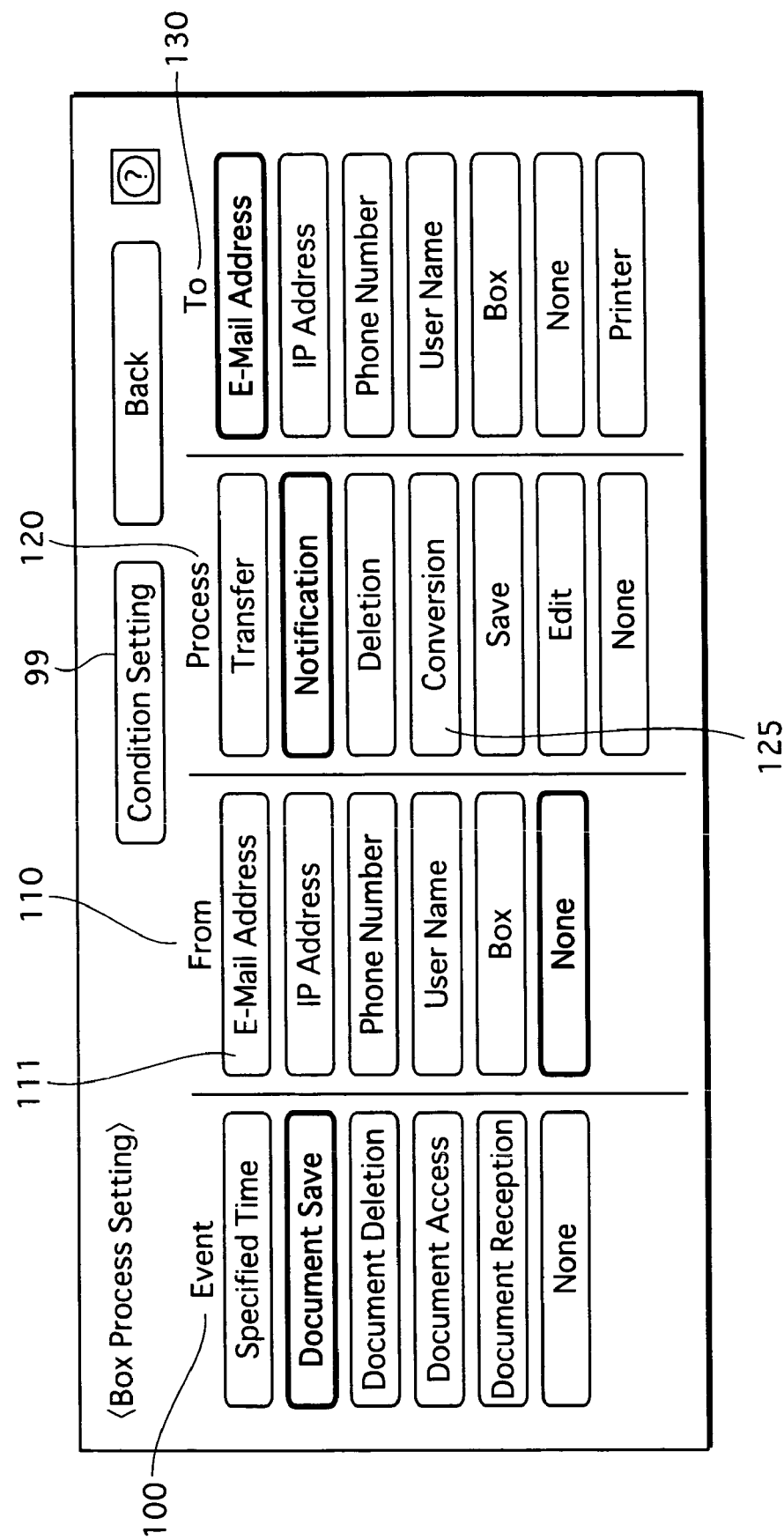
FIG. 12 shows a discrete Box setting screen.

FIG. 12 shows the discrete Box setting screen displayed in the step S404. Note that the setting screen displayed in the steps S4022-S4023 are identical to the one shown in FIG. 12. In the discrete Box setting, setting of four fields of the Box-definition list 35 is received. More specifically, setting of (1) "Event" 100, (2) "From" 110, (3) "To" 130, and (4) "Process" 120 are received. The Box-definition list 35 is then updated according to the received setting. Hereinafter, a description is given one by one to each field.

(1) The "Event" field 100 specifies a condition to be met to initiate a process associated with a corresponding Box. The condition is selected from the entries including a time (or date and time), document save, document deletion, document access, and document input. It is also applicable to set no conditions at all (to select "None").

(2) The "From" field 110 specifies an input source. The input source is selected from the entries including (i) E-Mail Address, (ii) IP Address, (iii) Telephone Number (in the case where a document is received via the FAX unit 14), (iv) User Name (set on the MFP 2), (v) Box Name, and (vi) None. The input source designated herein is used in the input source judgment (steps S204-205).

(i) E-Mail Address

Here, a description is given briefly to how to input an e-mail address.

Figure 13:
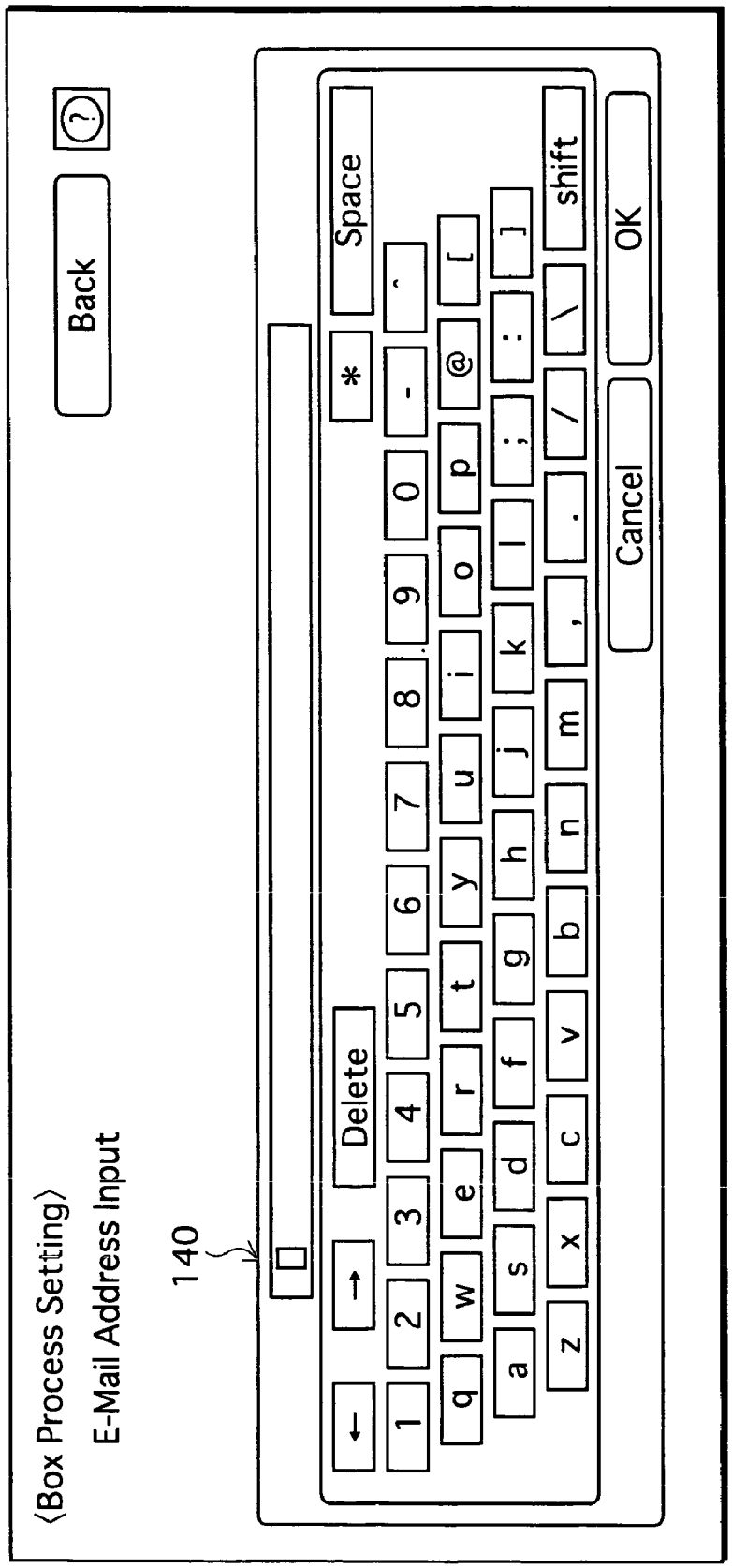
FIG. 13 shows a screen displaying a software keyboard 140.

FIG. 13 shows a screen displaying a software keyboard 140. With a touch of an "E-Mail Address" key 111 under the state where a "Condition Setting" key 99 is pushed to be ON, the screen shown in FIG. 13 displays. With keys on the software keyboard 140, users are allowed to enter e-mail addresses. An e-mail address may be input as an individual address or as a domain name in combination with a wildcard (*) (such as "*.konicaminolta.jp").

(3) The "To" field 130 specifies an output destination of a post-processed document. The output destination is selected from the entries including (i) E-Mail Address, (ii) IP Address, (iii) Telephone number, (iv) User name, (v) Box name, (vi) None, and (vii) Printer.

(4) The "Process" field 120 is selected from the entries including (i) Transfer, (ii) Notification, (iii) Deletion, (iv) Conversion, (v) Save, (vi) Edit, and (vii) None.

(i) The transfer process is to simply transfer a specified document to a specified output destination.

Figure 14:
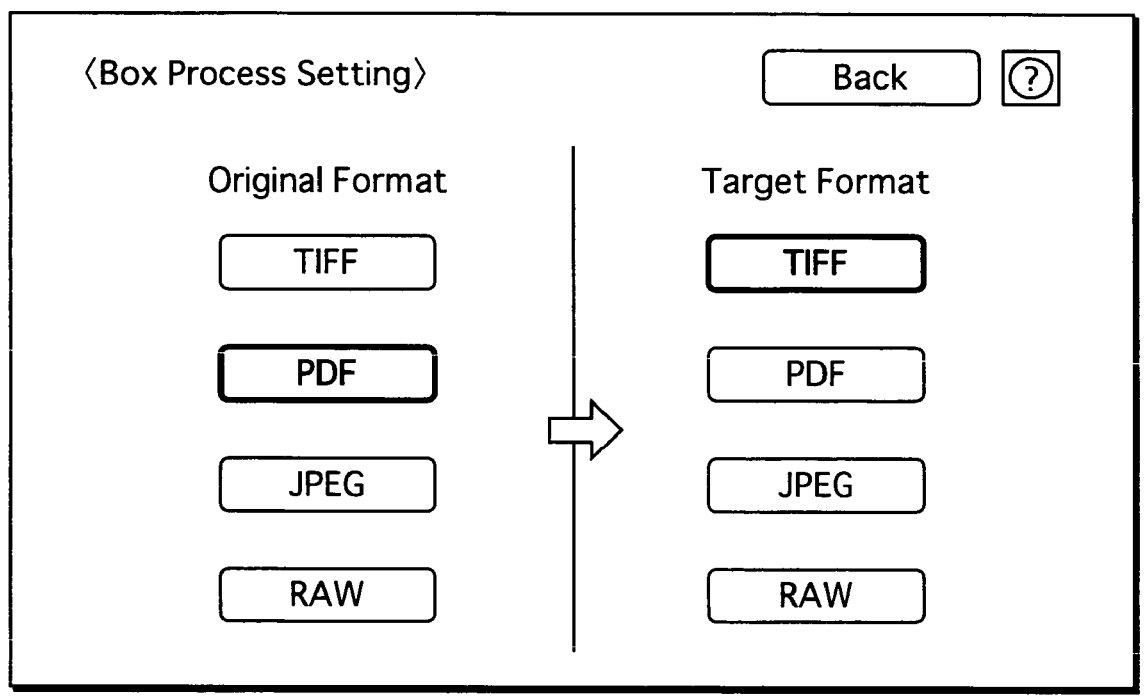
FIG. 14 shows a conversion setting screen.

(iv) The conversion process is to convert a specified document into a specified format. FIG. 14 shows a conversion setting screen. With a touch of a "Conversion" key 125 under the stated where the "Condition Setting" key 99 is pushed to be ON, the screen shown in FIG. 14 displays. As shown in FIG. 14, the pre- and post-conversion file formats are selectable from among the TIFF, PDF, JPEG, and RAW formats.

(vi) The edit process is to change the contents of a specified document (such as, creator, creation date and time, and title).

Referring back to the flowchart shown in FIG. 11, in the step S406, it is judged whether the selected discrete Box is a component of a compound Box.

If not a component of a compound Box (S406: No), the selected discrete Box is deleted (S408).

On the other hand, if the selected discrete Box is a component of a compound Box (S406: Yes), a warning is issued to inform the user that the selected Box is not allowed to be deleted (S407).

FIG. 15 shows a warning screen displayed in the step S407.

Deletion of a discrete Box is inhibited if the discrete Box is a component of any compound Box (if the discrete Box has a link to another discrete Box). This is because deletion of such a discrete Box disconnects the link between the deleted discrete Box and another discrete Box, which results in unintentional change in the structure of a compound Box to which the discrete Boxes belongs.

By displaying the warning screen informing that the discrete Box linked to another Box is not allowed to be deleted, the above-mentioned undesirable occurrence is prevented.

The warning may be made by any screen other than the one shown in FIG. 15, as long as the user is informed that deletion of the selected discrete Box is not permitted since the discrete Box has a link to another Box. Alternatively, the warning may be made by sound rather than by display.

Compound Box Setting

Next, a description is given to the compound Box setting (S304).

Figure 16:
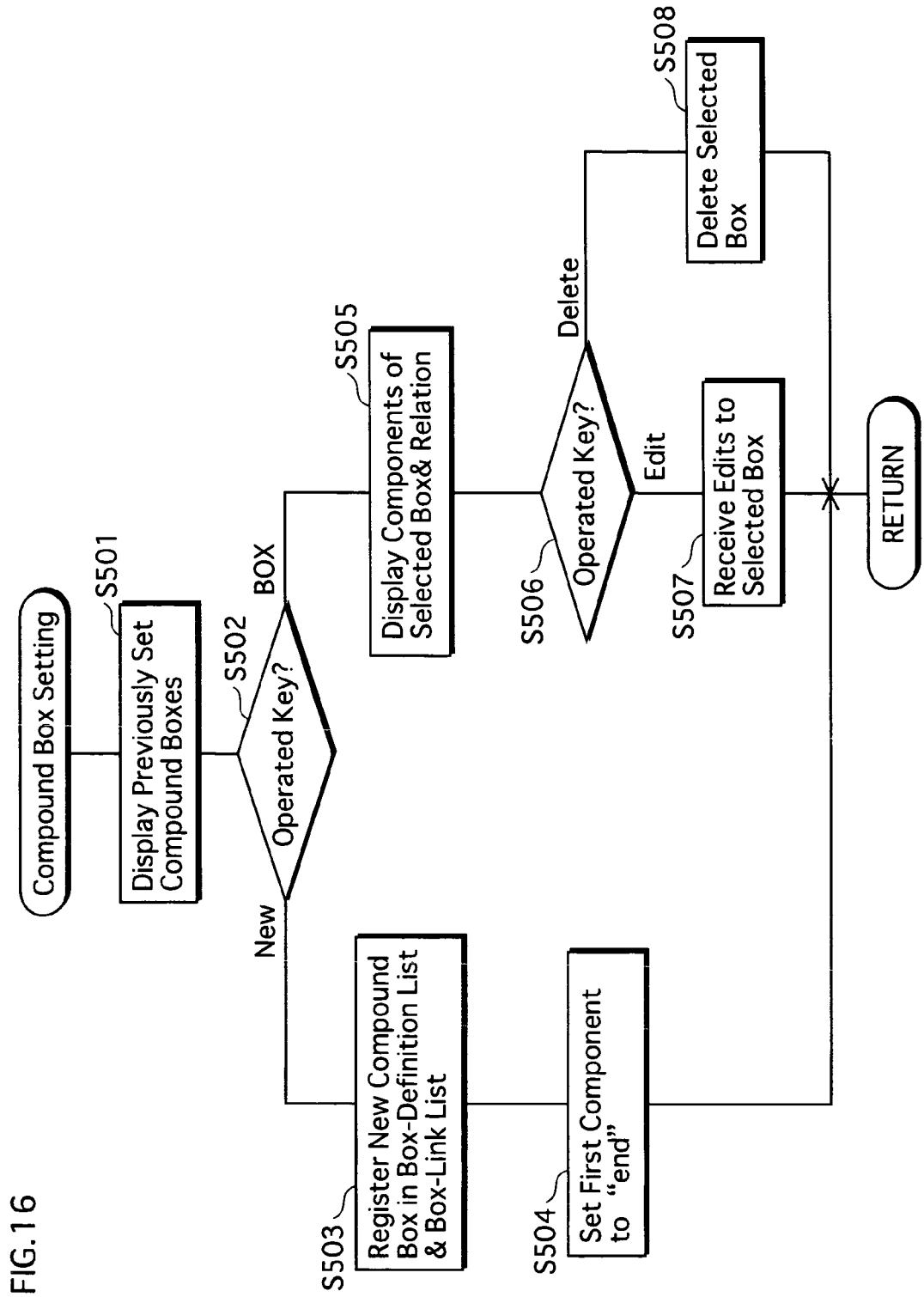
FIG. 16 is a flowchart of compound Box setting.

FIG. 16 is a flowchart of the compound Box setting.

In the compound Box setting, the Box-definition list 35 is read, so that all the previously set compound Boxes are displayed in the custom work area 60 (S501).

Figure 17:
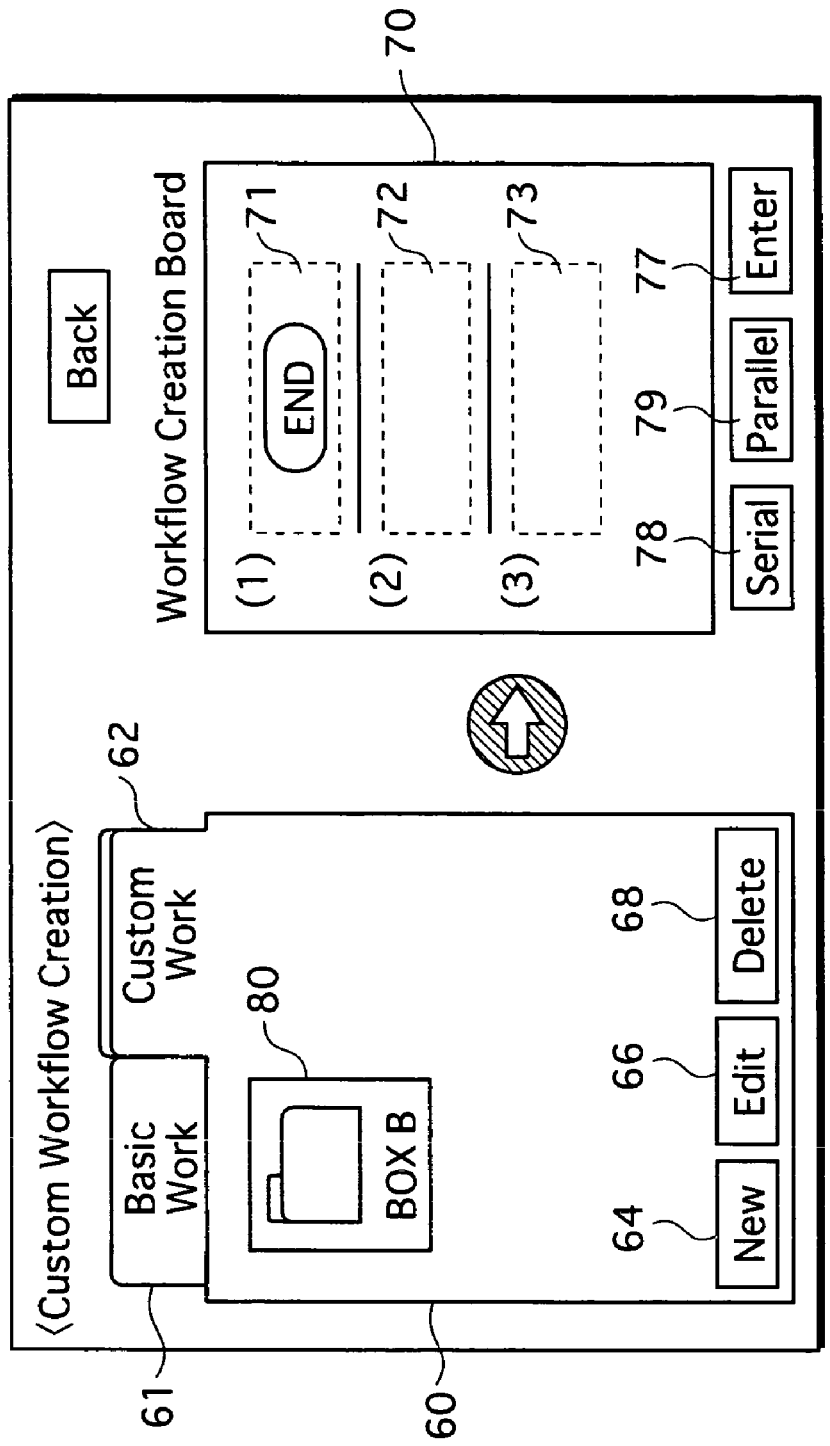
FIG. 17 shows a compound Box setting screen.

FIG. 17 shows a screen displayed in the step S501. A "Box B" key 80 displayed in the custom work area 60 is selectable with a touch.

The workflow creating board 70 has three areas 71, 72, and 73. Each of the areas 71, 72, and 73 are directly selectable with a touch. The number displayed to the top left of a respective area indicates the order of the area in the workflow.

With a touch of the "New" key 64 (S502: New), a new compound Box is registered into the Box-definition list 35 and the Box-link list 36 (S503). As shown in the Box-link list 36, the new compound Box is initially set to have "end" as the first component (S504). The other fields of the Box-link list 36 as well as of the Box-definition list 35 are left blank.

When any previously set compound Box is selected with a touch (S502: Box), information related to the selected compound Box is read from the Box-link list 36 and the discrete Boxes included in the selected compound Box are displayed on the workflow creation board 70 in a manner indicating the link relation (S505).

With a touch of the "Edit" key 66 under the state where a previously set compound Box is selected (S506: Edit), user input for editing the selected compound Box is allowed to be received (S507). On the other hand, with a touch of the "Delete" key 68, the selected compound Box is deleted (S508).

Specific Example of Setting Box B

Figure 18:
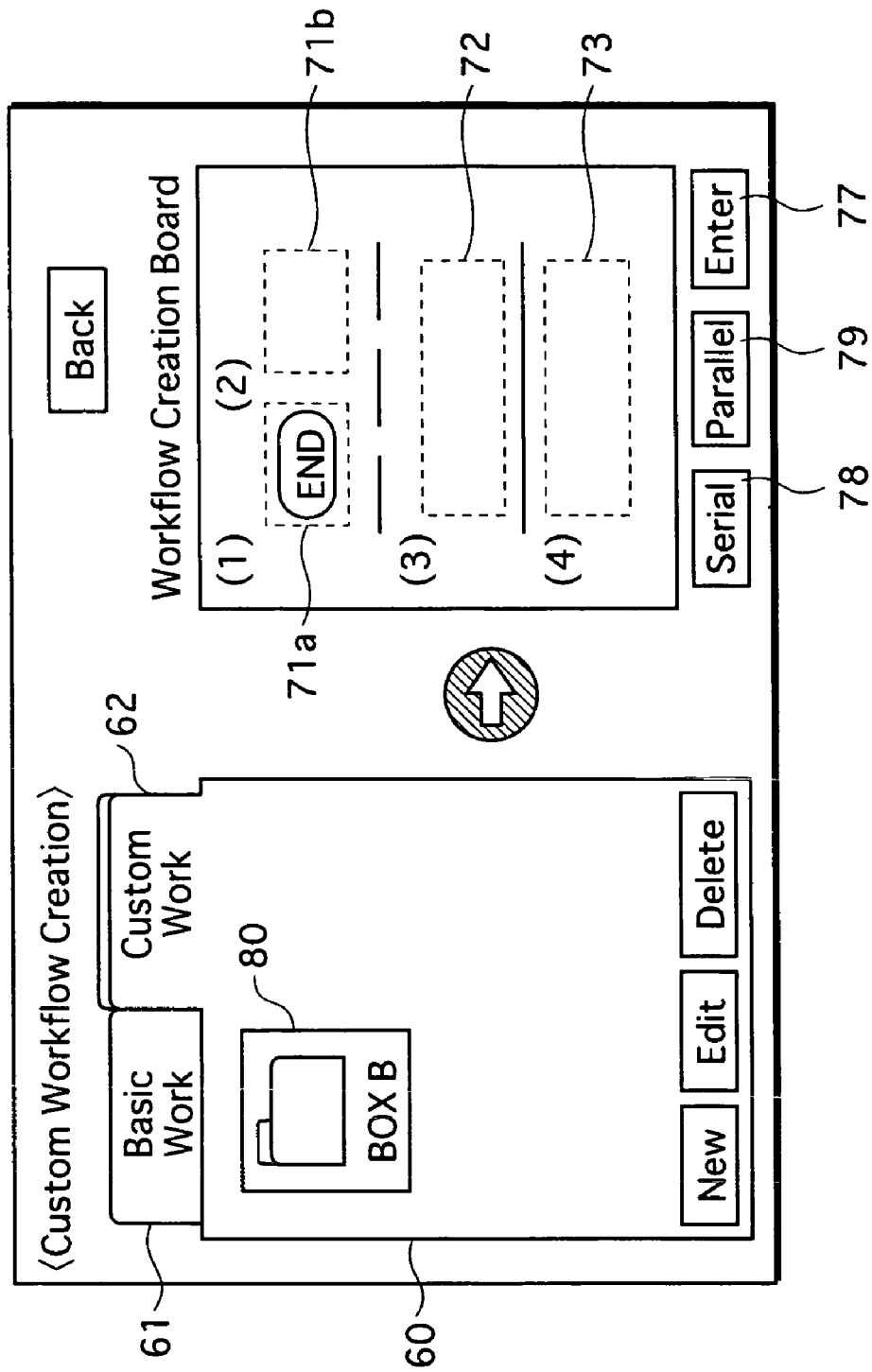
FIG. 18 shows a compound Box setting screen.

Now, the compound Box setting is described by way of a specific example of the compound "Box B". In the description, reference is made to FIGS. 17-19.

In FIG. 17, the compound "Box B" 80 is a newly created compound Box not having any link to any Box at this stage. Accordingly, in the area 71 on the workflow creation board 70, "End" indicating the end of the workflow is displayed.

With a touch of a "Parallel" key 79 on the screen shown in FIG. 17 under the state where the area 71 is selected, the area 71 is divided into an area 71a and an area 71b. As a result, the screen shown in FIG. 17 is altered to the screen shown in FIG. 18.

With a touch of the "Basic Work" tab key 61, the display is switched to the basic work area 60. On the thus displayed screen shown in FIG. 19, previously set discrete Boxes (namely, "Box A" 81, "Box C" 82, "Box D" 83, and "Box E" 84) are displayed within the area 60. With a touch of "Box C" 82 and then "Box D" 83, the Boxes 82 and 83 are additionally displayed in the areas 71a and 71b, respectively.

Next, with a touch of the "Enter" key 77 presented on the same screen, the newly set link between components of the compound "Box B" is entered.

Figure 19:
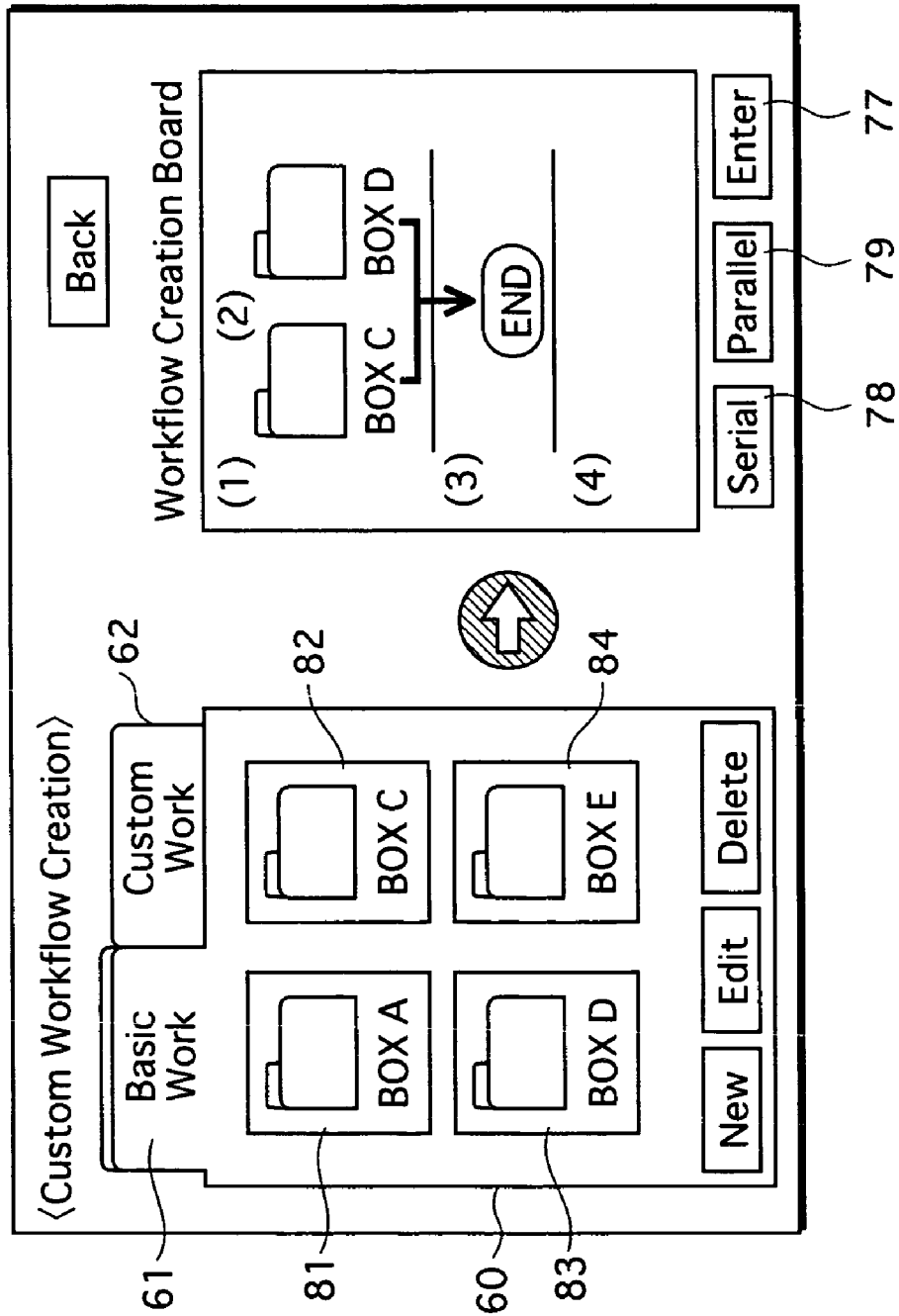
FIG. 19 shows a compound Box setting screen.

As shown in FIG. 19, "Box C" and "Box D" are displayed with icons and the two icons are connected with a line.

With the display as shown in FIG. 19, the user can intuitively understand that the "Box C" and "Box D" are linked in parallel.

Since there may be a numerous patterns of routine tasks as described earlier, it is extremely difficult to predict and prepare as templates, at the time of manufacturing MFP 2, all the workflows that users might request. Yet, the MFP 2 of the present embodiment allows the users to set a sequence of discrete Boxes and the link relation. Thus, the MFP 2 can meet the users' needs by flexibly setting (creating) a workflow for executing any sequence of processes as requested by the users.

In addition, such a workflow can be set with the simple operation of specifying the order of discrete Boxes, which is easier than conventionally required operation.

Box State Display

Next, a description is given to Box state display.

Figure 20:
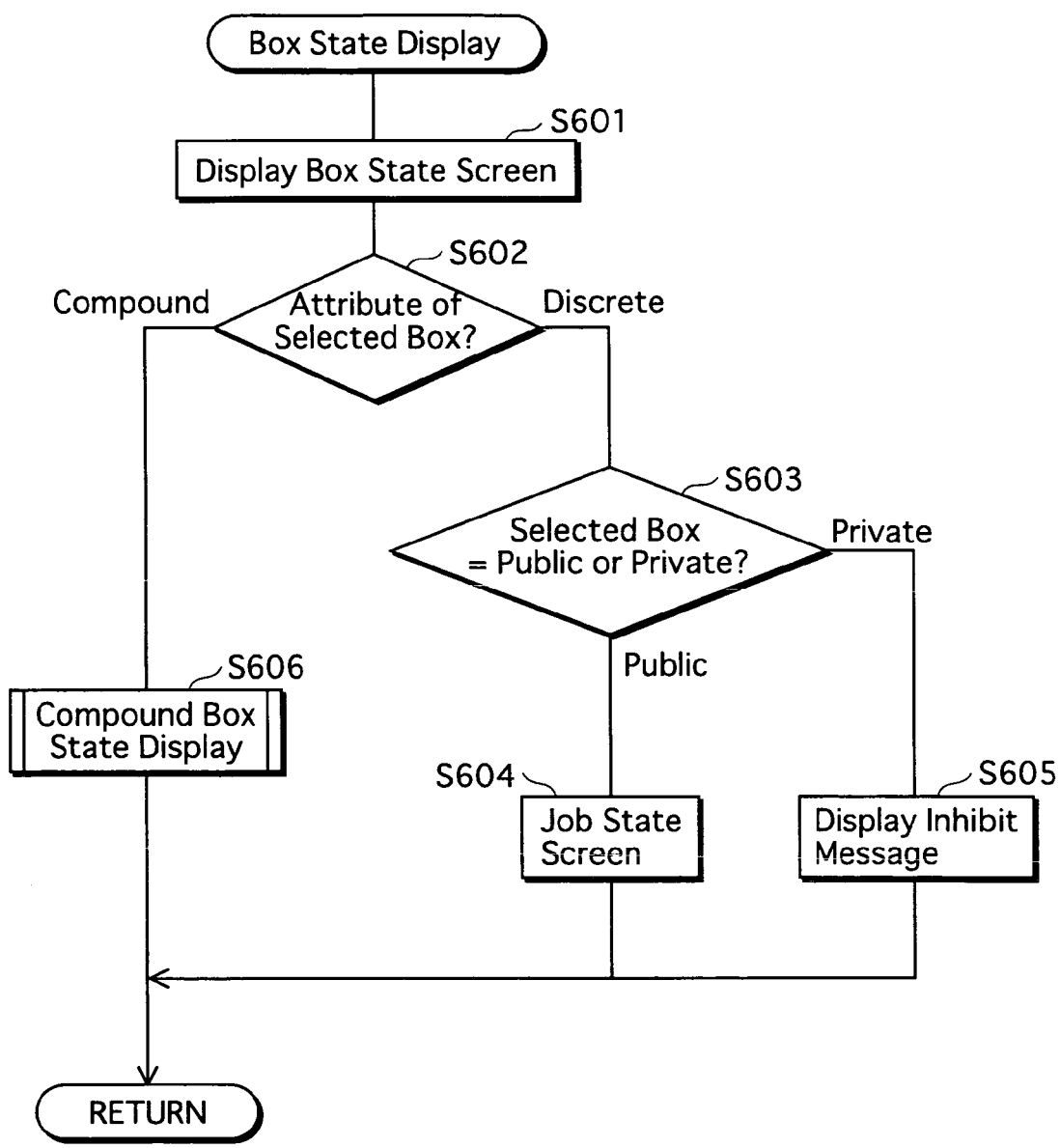
FIG. 20 is a flowchart of Box state display processing.

FIG. 20 is a flowchart of the Box state display processing.

First, the Box-definition list 35 is read, so that a Box state screen displays. The Box state screen shows the state of each in-process Box (currently being processed or in a standby state) out of all the Boxes included in the Box-definition list 35 (S601).

Alternatively to the Box-definition list 35, it is applicable to read the Job list 38 to display, among Jobs defined by a Box as shown in the Job definition Box field, Jobs that are currently being executed (processed) or standby.

Figure 21C:
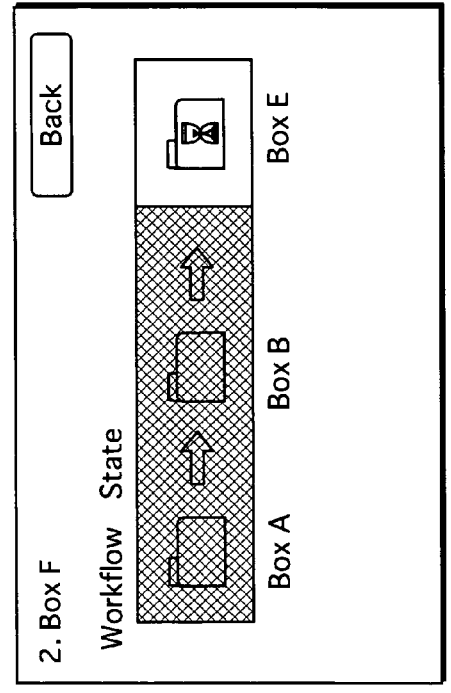
FIG. 21C shows a compound Box state screen.
Figure 21A:
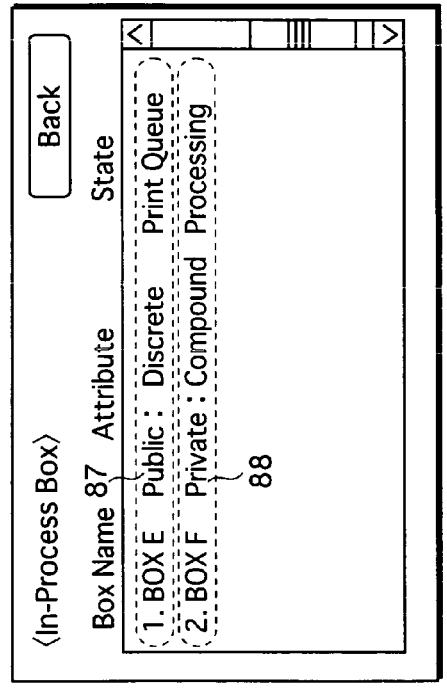
FIG. 21A shows a Box state screen.

FIG. 21A shows the Box state screen displayed in the step S601.

In the screen shown in FIG. 21A, the name and attribute of each Box is displayed along with whether the Box is already processed, currently processing, or on standby. "Box F" displayed on the screen is a compound Box. Thus, the execution state of "Box F" is of the entire process sequence associated with "Box F", not of each process of a respective discrete Box included in the compound Box.

Keys 87 and 88 displayed with doted lines enclosing "Box E" and "Box F", respectively, are selectable with a touch.

With a touch of the key 87 related to the discrete "Box E" (S602: Discrete), it is then judged whether the Box is "Pubic" or "Private" (S603). Since the "Box E" is a public Box, the judgment in the step S603 results in "Public" (S603: Public). Consequently, a step S604 is performed next to display a Job state screen.

Figure 21B:
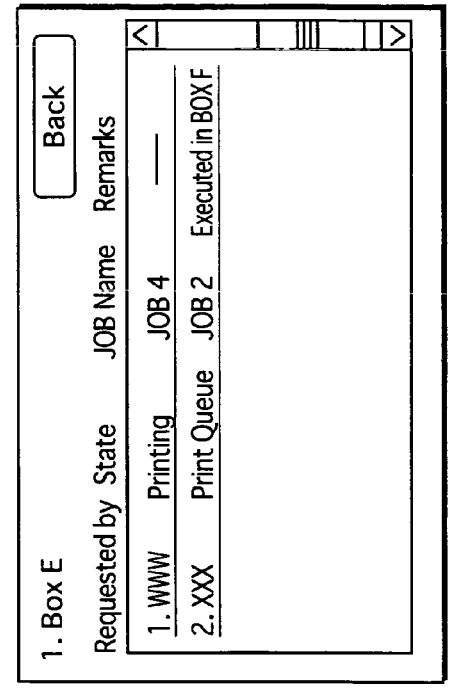
FIG. 21B shows a Job state screen.

FIG. 21B shows the Job state screen displayed in the step S604.

As shown in FIG. 21B, the screen shows two jobs corresponding to "Box E", along with the request source and current state of each job. More specially, the "request source" field displays the name of a user who requested (registered) a respective job, and the "state" field shows the progress of the job, i.e. whether the job has been completed or not.

The "request source" is specified using a user name in the case where the job is requested via a terminal such as PC, and using an authentication name in the case where the job is requested by way of personal authentication. In the case where the job is requested by a Box associated with a print job, the Box name may be displayed as the "request source".

In addition, each Job defined by "Box E" is obtained from the Job list 38. The screen shown in FIG. 21B displays each Job defined by "Box E", even in the case where "Box E" is executed in a process sequence associated with a compound Box. In FIG. 21B, "Job 4" is defined by the discrete "Box E" that is included in the compound "Box F".

Since "Box E" is open to the public (shared among multiple users), it is possible that a number of users request "Box E" and thus a number of print jobs are accumulated. As a result, it may take time to complete the print jobs.

In view of the above possibility, when a user requests a process including "Box E" associated with a print job (for example, the compound "Box F"), it is preferable to inform the user that there will be some waiting time before execution of the requested process.

Displaying such information is especially preferable in the case of print jobs. It is normally true that accumulated print jobs need to be sequentially performed one by one and thus waiting is likely to occur.

When the selected Box is judged in the step S603 as a "Private" Box (S603: Private), it is displayed that the state of the selected Box is not permitted to be displayed (for example, by displaying a message reading "this Box is private, so that the Box state is not permitted to be displayed"). The state of a private Box is not permitted to be displayed for security reason. However, an arrangement maybe made to display the state of a private Box after authentication using, for example, a password.

In this case, the jobs displayed would be ones requested by authenticated users.

With a touch of the compound "Box F" key 88 on the screen shown in FIG. 21A (S602: Compound), processing for displaying the state of compound Box is performed (S606).

Compound Box State Display

Figure 22:
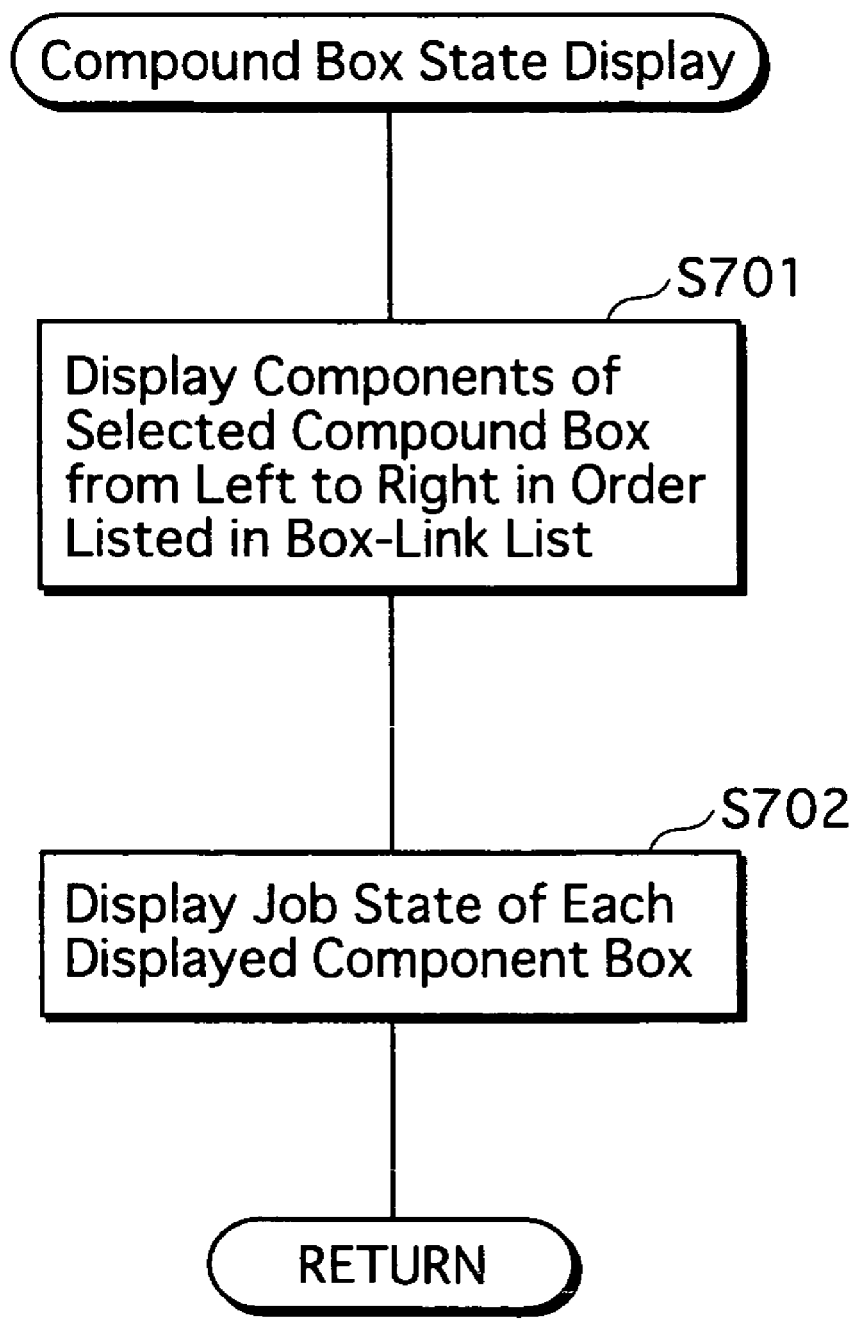
FIG. 22 is a flowchart of compound Box state display processing.

FIG. 22 is a flowchart of the compound Box state display processing.

First, with reference to the Box-link list 36, discrete Boxes belonging to the selected compound Box are displayed in a single line from the left to right in the order of processing (S701).

Next, with reference to the "Job state" shown in the Job list 38 (FIG. 5), information on the progress (i.e. execution state) of each discrete Box and each job is obtained. Then, each discrete Box is displayed in accordance with the progress thereof (standby, processing, or processed) (S702).

FIG. 21C shows a screen displayed in the compound Box state display processing.

On the screen, each discrete Box contained in the compound "Box F" is displayed in a single line from the left to right in the order of processing. The discrete "Box A" and "Box B" are displayed in a shaded area to indicate that the Boxes have already been processed. The discrete "Box E" is displayed with a graphical representation of a sand timer overlaid thereon to indicate that the Box is currently being processed. The progress of each discrete Box is displayed in accordance with the Job state shown in the Job list 38 (see FIG. 5).

As descried, each Box is displayed in a different manner depending on whether execution of the Box has been completed or underway. With such display, the user is allowed to instantly figure out the progress of the entire workflow. In addition, in the case where the execution of the compound Box is delayed or halted for some reason, the user can identify the discrete Box causing the trouble. This will help the user to quickly take corrective steps.

Figure 23:
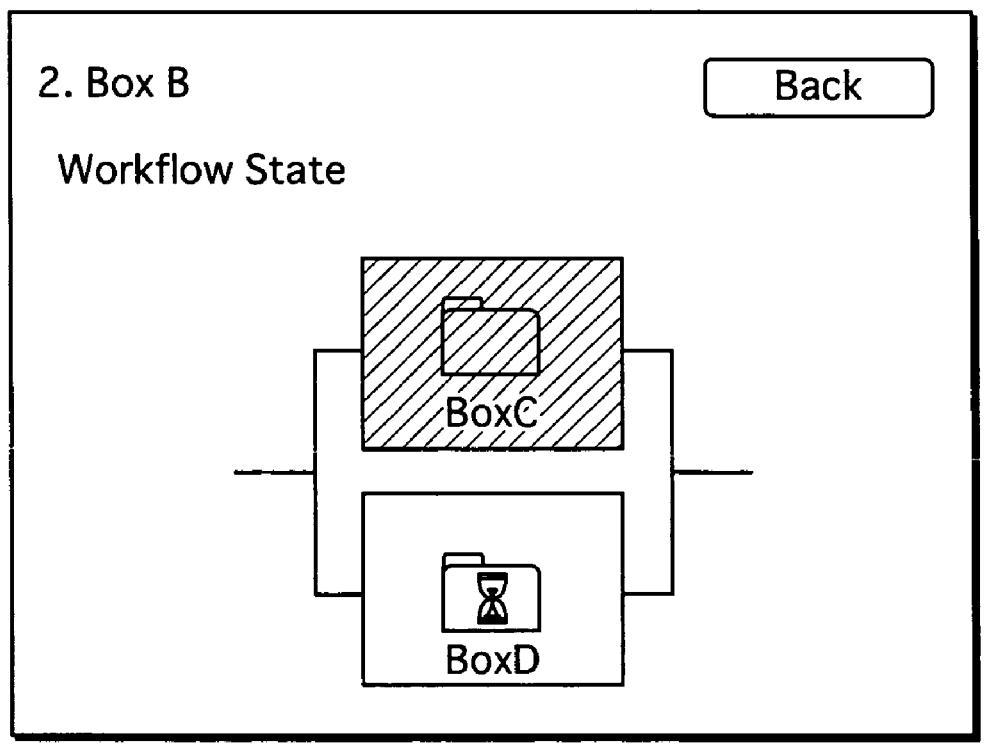
FIG. 23 shows another compound Box state screen.

FIG. 23 shows another example of the screen displayed in the compound Box state display processing.

The screen shown in FIG. 23 displays the compound "Box B" along with its components (discrete "Box C" and "Box D"), which are set to be processed in parallel.

The discrete "Box C" is displayed with oblique lines overlaid thereon to indicate that the Box has already been processed. On the other hand, the discrete "Box D" is displayed with a sand timer overlaid thereon to indicate the Box is now being processed.

As shown in FIG. 23, it is displayed that the process of "Box D" has not been completed yet. The process associated with "Box D" is notification mail transmission, which is normally completed instantly. Thus, the user is given a clue that something wrong has occurred during the notification mail transmission associated with "Box D".

In the above description, it is described that the job state is either "Processed", "Processing", or "Standby". Yet, in practice, it is applicable to regard "Error" as one job state in which an error occurs during execution of a Box.

Specific Example in which "Box F" Receives Document

Next, a description is given to a specific example in which the compound "Box F" receives a document.

Figure 24:
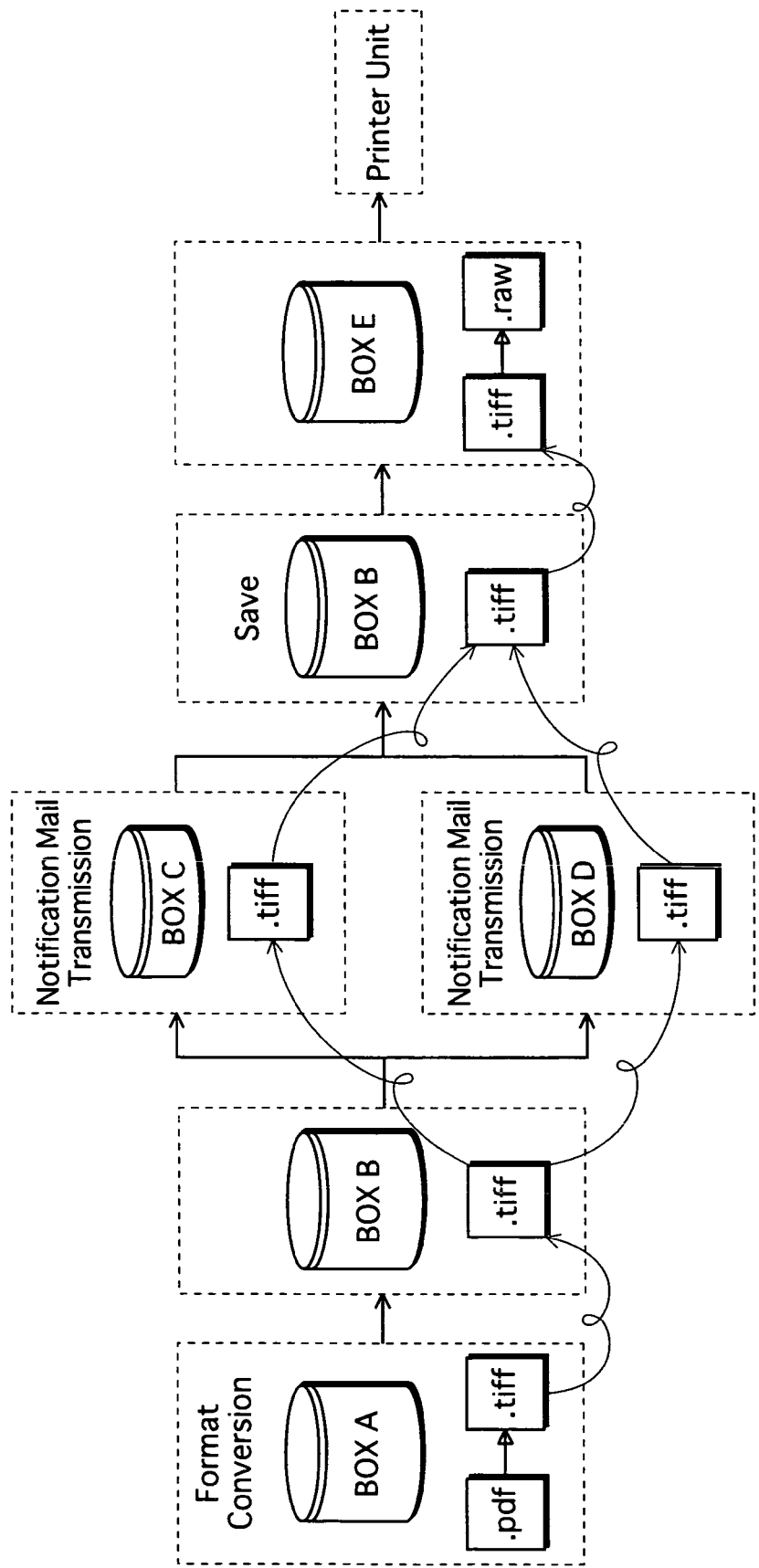
FIG. 24 illustrates a process sequence associated with a compound Box, along with the flow of a document among discrete Boxes included in the compound Box.

FIG. 24 illustrates the processes performed upon receipt of a document by the compound "Box F", as well as the flow of the document among the discrete Boxes included in the compound "Box F".

For the illustrative purpose, suppose that the compound "Box F" receives a PDF document. Upon receipt of the document, processes associated with the components (discrete Boxes) of "Box F" are performed in the sequence defined in the Box-link list 36. More specifically, the following processes associated with (1) Box A, (2) Box B, and (3) Box E are sequentially performed on the received document in the stated order.

(1) Conversion from the PDF format into the Tiff format (Box A);

(2) Save the document (Box B); and (3) Transfer the document to the printer unit 16 (Box E).

Note that "Box B" is linked to "Box C" and "Box D" in parallel. Thus, the document is output from "Box B" to both "Box C" and "Box D", and separate notification mall transmission processes are performed in parallel. Upon completion of both the mail transmission processes, the document is passed to "Box E".

As described above, according to the present embodiment, it is possible to sequentially perform a series of processes on one document. In addition, it appears to the user that the series of processes is performed simply by inputting the document into "Box F".

In addition, since each process associated with a Box is defined to be performed on a document received by the Box, the software configuration can be simplified.

Up to this point, the description has been given to the specific embodiment of the present invention. It is naturally appreciated, however, that the present invention is not limited to the above specific embodiment.

Modification 1

According to the above embodiment, the Box-definition holding subunit 34 in the control unit 30 collectively holds the Box-definition list 35 and the Box-link list 36 and manages both the lists. Yet, it is applicable to distribute the lists among the Boxes.

Figure 25A:
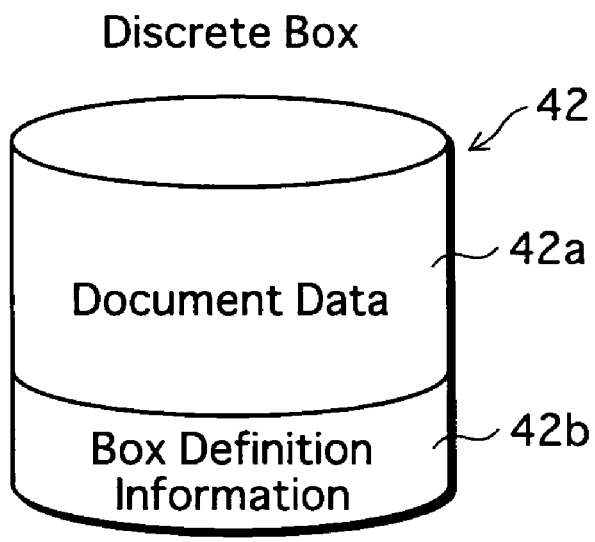
FIG. 25A shows the data structure of a discrete Box according to a modification 1.
Figure 25B:
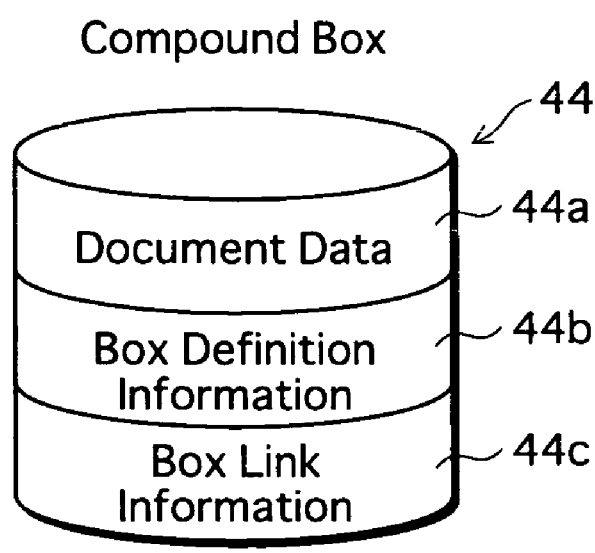
FIG. 25B shows the data structure of a compound Box according to the modification 1.

FIGS. 25 each show the data structure of a Box according to the modification 1. More specifically, FIG. 25A shows the data structure of a discrete Box 42, and FIG. 25B shows the data structure of a compound Box 44.

The discrete Box 42 includes document data 42a and Box definition information 42b. Similarly to the Box-definition list 35 shown in FIG. 3, the Box definition information 42b is composed generally of information showing (i) the attribute of the Box, (ii) a document input source, (iii) a document output destination, and (d) a process associated with the Box.

The document data 42a may be any data allowing the document to be managed. For example, the document data 42a may be the contents of the document itself or a link to the storage location of the document. The latter case is advantageous for saving the storage space of the MFP 2.

The compound Box 44 is composed of, in addition to document data 44a and Box process definition information 44b, Box link information 44c.

Modification 2

According to the above embodiment, it is displayed in the step S604 simply whether each job is currently being processed or not (See FIG. 21B).

Figure 26:
FIG. 26 shows a job state screen according to a modification 2.

Alternatively, it is applicable to display the progress in greater detail as shown in FIG. 26. In addition, it is applicable to make arrangement to display the screen shown in FIG. 26 at a touch of "Box A" shown in FIG. 21C.

FIG. 26 shows an exemplary display screen showing the job state, according to the modification 2. As shown in the figure, the progress of the format conversion (.pdf→.tiff) is displayed as a percentage (50% in the figure), along with the remaining processing time expected to be taken to complete the job (12 sec, in the figure). The expected remaining processing time is calculated with reference, for example, to the history showing the past processing times. By displaying the progress of time-consuming processes, such as the conversion process, the user convenience increases.

Modification 3

According to the above embodiment, the compound Box state display simply shows that "Box D" (FIG. 23) is currently under processing. It is applicable to additionally provide timeout processing to display a message prompting the user to select whether to skip the process that is incomplete due to unexpected delay or halt.

Figure 27:
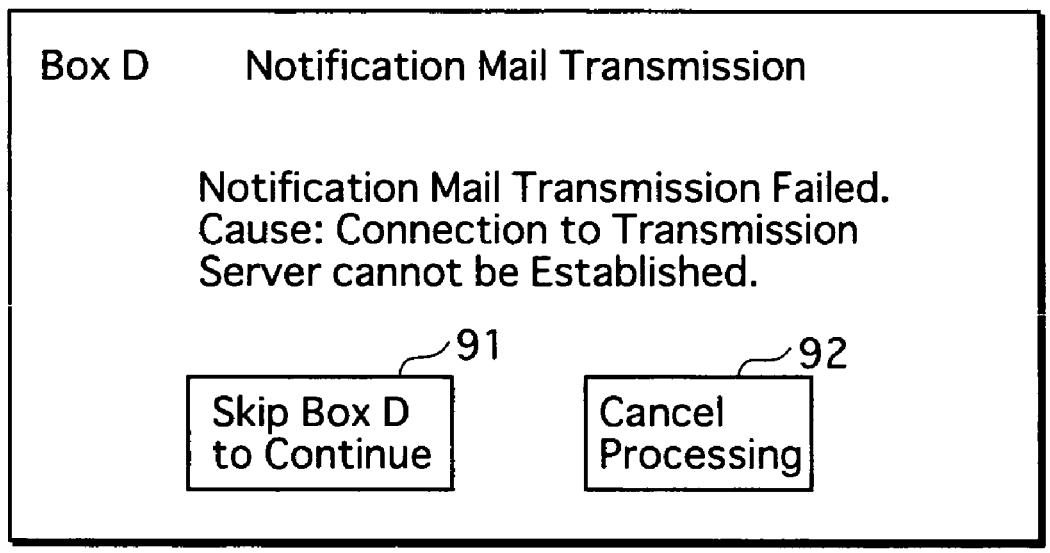
FIG. 27 shows a screen notifying users of an incomplete process, according to a modification 3.

FIG. 27 shows a screen notifying the user of an incomplete process. As shown in the figure, it is displayed that the notification mail transmission is failed, along with the cause the failure.

In addition, the screen displays "Skip to Continue" key 91 and "Cancel" key 92. Since the discrete "Box D" is a component of the compound "Box B", execution of the compound "Box B" can not be completed without completing the process associated with the discrete "Box D". With a touch of the "Continue" key 91 by the user, the process associated with the discrete "Box D" is skipped to continue the execution of the compound "Box B".

Supplemental Note (1) According to the above embodiment, the workflow system 1 is composed of the MFP 2, which is a document processor. It is naturally appreciated, however, that the workflow system may alternatively be composed of a plurality of document processors connected over a network or of a plurality of other devices.

(2) The present invention is applicable not only to a workflow display method, but also to a program run by a computer to carry out the method described above. The program may be stored on various types of computer-readable recording media including: magnetic tapes; magnetic discs, such as flexible disks; optical media, such as DVDs, CD-ROMs, MOs, and PDs; and flash memory, such as Smart Media (Registered Trademark). The program may be manufactured and/or transferred in the form being stored on a recording medium. Alternatively, the program may be transmitted over various types of wired or wireless network including the Internet, via a broadcast, telecommunication line, or satellite communications.

In addition, it is not necessary that such a program according to the present invention includes all modules for causing a computer to perform the above processes. For example, it is applicable to cause a computer to perform the processes of the present invention, by using a general purpose program such as a communication program or a program included in an operating system. Thus, it is not necessary that all the modules are stored on the recording medium according to the present invention. Similarly, it is not necessary that all the modules are transmitted. In addition, there may be a case where a predetermined process may be performed using dedicated hardware.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A display method for execution by a document processing apparatus having a storage unit that stores a plurality of discrete Boxes associated with a document process for an input document, and that stores a compound Box associated with a document process for the input document by defining a sequence of the discrete Boxes in a link relation, the display method comprising:

a sequence setting step of setting the discrete Boxes and selecting the link relation between the discrete Boxes;

a box-execution control step of causing the document process associated with the discrete Boxes to be executed when a first document is processed by the discrete Boxes, and causing the document process associated with the discrete Boxes in the sequence and the link relation to be executed when a second document is processed by the compound Box;

a first display step of displaying a box state screen representing whether at least one discrete Box or the compound Box is being processed or is in a standby state;

a first receiving step of receiving a selection of the at least one discrete Box in the box state screen; and a second display step of displaying a job state screen simultaneously representing an execution state which shows a progress of the document process of the first document corresponding to the selected discrete Box and an execution state which shows a progress of the document process of the second document corresponding to the compound Box.

2. The display method according to claim 1, further comprising:

a second receiving step of receiving a selection of the compound Box displayed in the box state screen; and a third display step of displaying icons representing linked discrete Boxes laid out in the sequence and displaying information showing an execution state of each discrete Box, out of all the discrete Boxes corresponding to the icons displayed, associated with a currently executed process.

3. The display method according to claim 2, wherein in the third display step, the icons representing the linked discrete Boxes are displayed differently depending on whether the document process associated with a respective Box has not been initiated or has been completed.

4. The display method according to claim 1, wherein the displayed execution state shows how much of the entire document process has already been completed.

5. The display method according to claim 1, wherein the displayed execution state shows a remaining time taken to complete the document process.

6. The display method according to claim 5, wherein the displayed execution state is obtained using a history of processes previously executed.

7. The display method according to claim 1, wherein the displayed execution state shows that the document process is halted due to an error.

8. The display method according to claim 7, further comprising:
a skip selecting step of displaying a prompt for selecting whether to skip the halted process.

9. The display method according to claim 1, wherein
the link relation is that the discrete Boxes are linked serially or that the discrete Boxes are linked in parallel.

10. The display method according to claim 1, wherein
in the second display step, an execution state of the input document to the selected discrete Box and an execution state of the input document to the compound Box are discernably represented.

11. A document management apparatus for displaying a workflow, the apparatus comprising:
a storage unit that stores a plurality of discrete Boxes associated with a document process for an input document, and that stores a compound Box associated with a document process for the input document by defining a sequence of the discrete Boxes in a link relation, each of the discrete Boxes being a predetermined storage area of the storage unit;
a sequence setting unit operable to set the discrete Boxes and select the link relation between the discrete Boxes;
a box-execution control unit operable to cause the document process associated with the discrete Boxes to be executed when a first document is processed by the discrete Boxes, and causing the document process associated with the discrete Boxes in the sequence and the link relation to be executed when a second document is processed by the compound Box;
a first display unit operable to display a box state screen representing whether at least one discrete Box or the compound Box is being processed or is in a standby state;
a first receiving unit operable to receive a selection of the at least one discrete Box in the box state screen; and
a second display unit operable to display a job state screen simultaneously representing an execution which shows a progress of the document process state of the first document corresponding to the selected discrete Box and an execution state which shows a progress of the document process of the second document corresponding to the compound Box.

12. The document management apparatus according to claim 11, further comprising:
a second receiving unit operable to receive a selection of the compound Box displayed in the box state screen; and
a third display unit operable to display icons representing linked discrete Boxes laid out in the sequence and displaying information showing an execution state of each discrete Box, out of all the discrete Boxes corresponding to the icons displayed, associated with a currently executed process.

13. The document management apparatus according to claim 12, wherein
the third display unit is further operable to display the icons representing the linked discrete Boxes differently depending on whether the document process associated with a respective Box has not been initiated or has been completed.

14. The document management apparatus according to claim 11, wherein
the displayed execution state shows how much of the entire document process has already been completed.

15. The document management apparatus according to claim 11, wherein
the displayed execution state shows a remaining time taken to complete the document process.

16. The document management apparatus according to claim 15, wherein
the displayed execution state is obtained using a history of document processes previously executed.

17. The document management apparatus according to claim 11, wherein
the displayed execution state shows that the document process is halted due to an error.

18. The document management apparatus according to claim 17, further comprising:
a skip selecting unit operable to display a prompt for selecting whether to skip the halted process.

19. The display method according to claim 11, wherein
the link relation is that the discrete Boxes are linked serially or that the discrete Boxes are linked in parallel.

20. The display method according to claim 11, wherein
the second display unit is operable to display an execution state of the input document to the selected discrete Box and an execution state of the input document to the compound Box discernably.

* * * * *